Oct. 24, 1967  J. T. EVANS  3,349,229
APPARATUS TO PERMIT BOTH CONTOURING AND NUMERICAL
POSITIONING OPERATIONS WITH A COMMON
CONTROL SYSTEM
Filed July 8, 1963  15 Sheets-Sheet 1

INVENTOR:
JOHN T. EVANS
BY
Robert R. Strack
ATTORNEY

FIG.3A
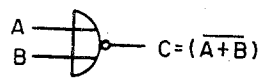
FIG.3B
| A | B | (A+B) | $\overline{(A+B)}$ |
|---|---|-------|--------------------|
| 0 | 0 | 0     | 1                  |
| 0 | 1 | 1     | 0                  |
| 1 | 0 | 1     | 0                  |
| 1 | 1 | 1     | 0                  |
FIG.3C
FIG.3E
| A | B | C D | $G_N$ | $G_{N+1}$ | $H_N$ | $H_{N+1}$ |
|---|---|-----|-------|-----------|-------|-----------|
| 0 | 0 | PULSE ABSENT | 0 | 0 | 1 | 1 |
|   |   |              | 1 | 1 | 0 | 0 |
| 0 | 1 | PULSE ABSENT | 0 | 0 | 1 | 1 |
|   |   |              | 1 | 1 | 0 | 0 |
| 1 | 0 | PULSE ABSENT | 0 | 0 | 1 | 1 |
|   |   |              | 1 | 1 | 0 | 0 |
| 1 | 1 | PULSE ABSENT | 0 | 0 | 1 | 1 |
|   |   |              | 1 | 1 | 0 | 0 |
| (NOT ALLOWED) 0 | 0 | PULSE PRESENT | 0 | 0 | — | — |
|   |   |               | 1 | 1 | — | — |
| 0 | 1 | PULSE PRESENT | 0 | 1 | 1 | 0 |
|   |   |               | 1 | 1 | 0 | 0 |
| 1 | 0 | PULSE PRESENT | 0 | 0 | 1 | 1 |
|   |   |               | 1 | 0 | 0 | 1 |
| 1 | 1 | PULSE PRESENT | 0 | 0 | 1 | 1 |
|   |   |               | 1 | 1 | 0 | 0 |
FIG.3F
| | E | F | G | H |
|---|---|---|---|---|
| NORMAL STATE FOR OPERATION WITH TRIGGER INPUTS | 0 | 0 | NO CHANGE | |
| ELECTRONIC SET TO 0 STATE | 0 | 1 | 0 | 1 |
| ELECTRONIC SET TO 1 STATE | 1 | 0 | 1 | 0 |
| HOLDS BOTH OUTPUTS AT 0 LEVELS | 1 | 1 | 0 | 0 |
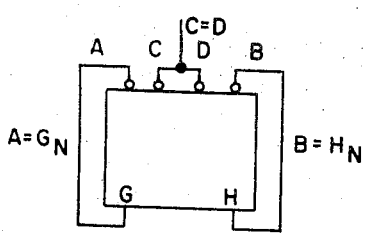
FIG.3G
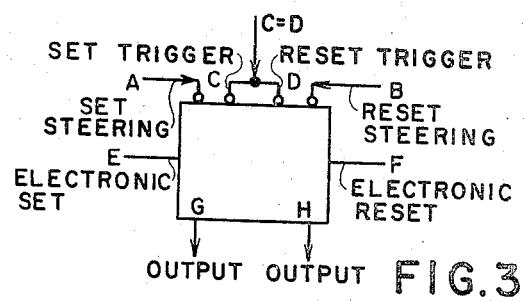
FIG.3D

| INPUTS | | | | | | OUTPUTS | | | |
|---|---|---|---|---|---|---|---|---|---|
| E | F | C | D | A | B | $G_N$ | $G_{N+1}$ | $H_N$ | $H_{N+1}$ |
| 0 | 1 | PULSE MAY BE PRESENT OR ABSENT | | MAY BE EITHER 0 OR 1 | | 0 | 0 | 1 | 1 |
| | | | | | | 1 | 0 | 0 | 1 |
| 1 | 0 | | | | | 0 | 1 | 1 | 0 |
| | | | | | | 1 | 1 | 0 | 0 |
| 1 | 1 | | | | | 0 | 0 | 1 | 0 |
| | | | | | | 1 | 0 | 0 | 0 |
| 0 | 0 | PULSE ABSENT | PULSE ABSENT | 0 | 0 | 0 | 0 | 1 | 1 |
| | | | | | | 1 | 1 | 0 | 0 |
| 0 | 0 | PULSE ABSENT | PULSE ABSENT | 0 | 1 | 0 | 0 | 1 | 1 |
| | | | | | | 1 | 1 | 0 | 0 |
| 0 | 0 | PULSE ABSENT | PULSE ABSENT | 1 | 0 | 0 | 0 | 1 | 1 |
| | | | | | | 1 | 1 | 0 | 0 |
| 0 | 0 | PULSE ABSENT | PULSE ABSENT | 1 | 1 | 0 | 0 | 1 | 1 |
| | | | | | | 1 | 1 | 0 | 0 |
| 0 | 0 | PULSE ABSENT | PULSE PRESENT | 0 | 0 | 0 | 0 | 1 | 1 |
| | | | | | | 1 | 0 | 0 | 1 |
| 0 | 0 | PULSE ABSENT | PULSE PRESENT | 0 | 1 | 0 | 0 | 1 | 1 |
| | | | | | | 1 | 1 | 0 | 0 |
| 0 | 0 | PULSE ABSENT | PULSE PRESENT | 1 | 0 | 0 | 0 | 1 | 1 |
| | | | | | | 1 | 0 | 0 | 1 |
| 0 | 0 | PULSE ABSENT | PULSE PRESENT | 1 | 1 | 0 | 0 | 1 | 1 |
| | | | | | | 1 | 1 | 0 | 0 |
| 0 | 0 | PULSE PRESENT | PULSE ABSENT | 0 | 0 | 0 | 1 | 1 | 0 |
| | | | | | | 1 | 1 | 0 | 0 |
| 0 | 0 | PULSE PRESENT | PULSE ABSENT | 0 | 1 | 0 | 1 | 1 | 0 |
| | | | | | | 1 | 1 | 0 | 0 |
| 0 | 0 | PULSE PRESENT | PULSE ABSENT | 1 | 0 | 0 | 0 | 1 | 1 |
| | | | | | | 1 | 1 | 0 | 0 |
| 0 | 0 | PULSE PRESENT | PULSE ABSENT | 1 | 1 | 0 | 0 | 1 | 1 |
| | | | | | | 1 | 1 | 0 | 0 |
| 0 | 0 | PULSE PRESENT | PULSE PRESENT | 0 NOT ALLOWED | 0 | 0 | — | 1 | — |
| | | | | | | 1 | — | 0 | — |
| 0 | 0 | PULSE PRESENT | PULSE PRESENT | 0 | 1 | 0 | 1 | 1 | 0 |
| | | | | | | 1 | 1 | 0 | 0 |
| 0 | 0 | PULSE PRESENT | PULSE PRESENT | 1 | 0 | 0 | 0 | 1 | 1 |
| | | | | | | 1 | 0 | 0 | 1 |
| 0 | 0 | PULSE PRESENT | PULSE PRESENT | 1 | 1 | 0 | 0 | 1 | 1 |
| | | | | | | 1 | 1 | 0 | 0 |

FIG. 3H

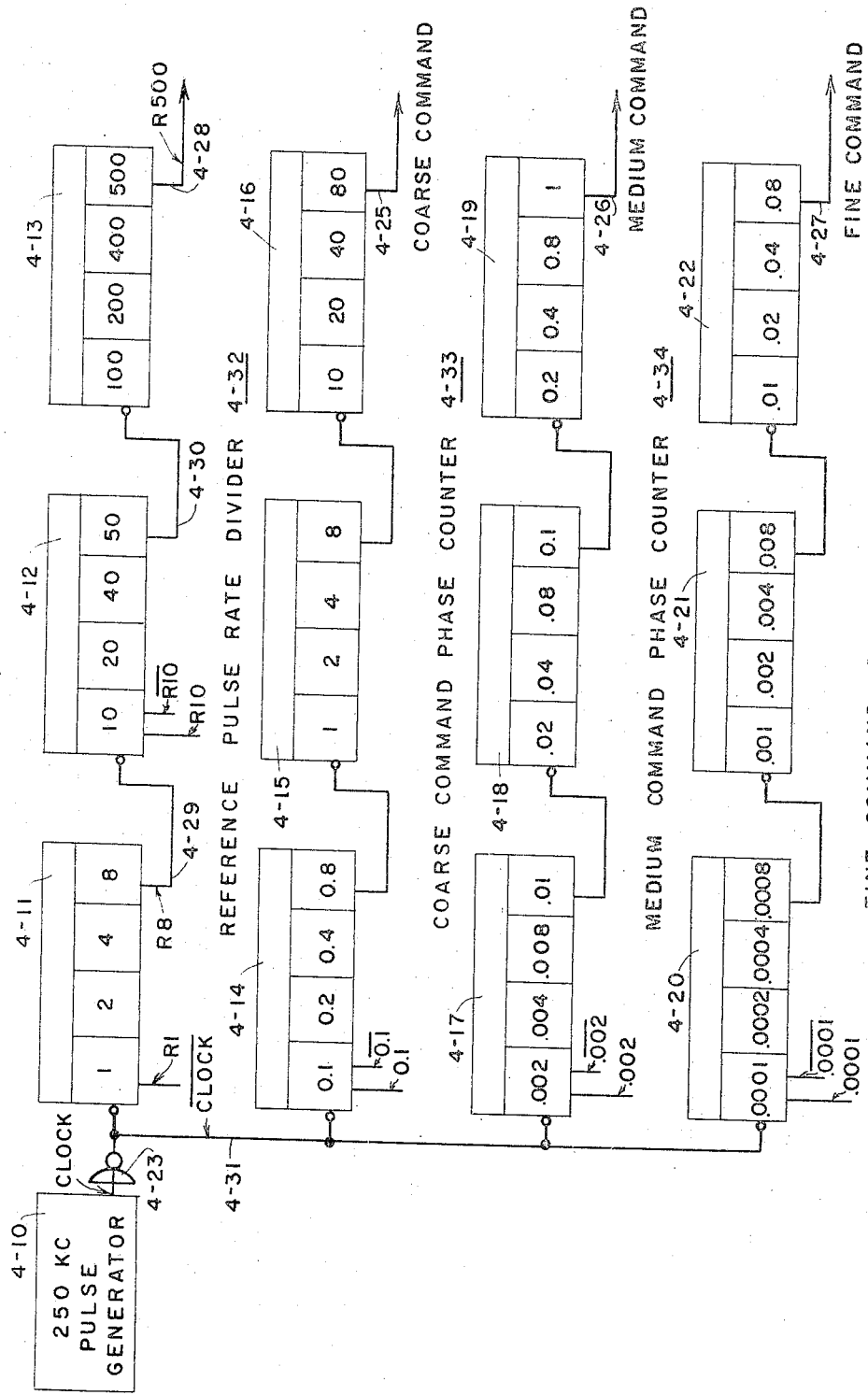

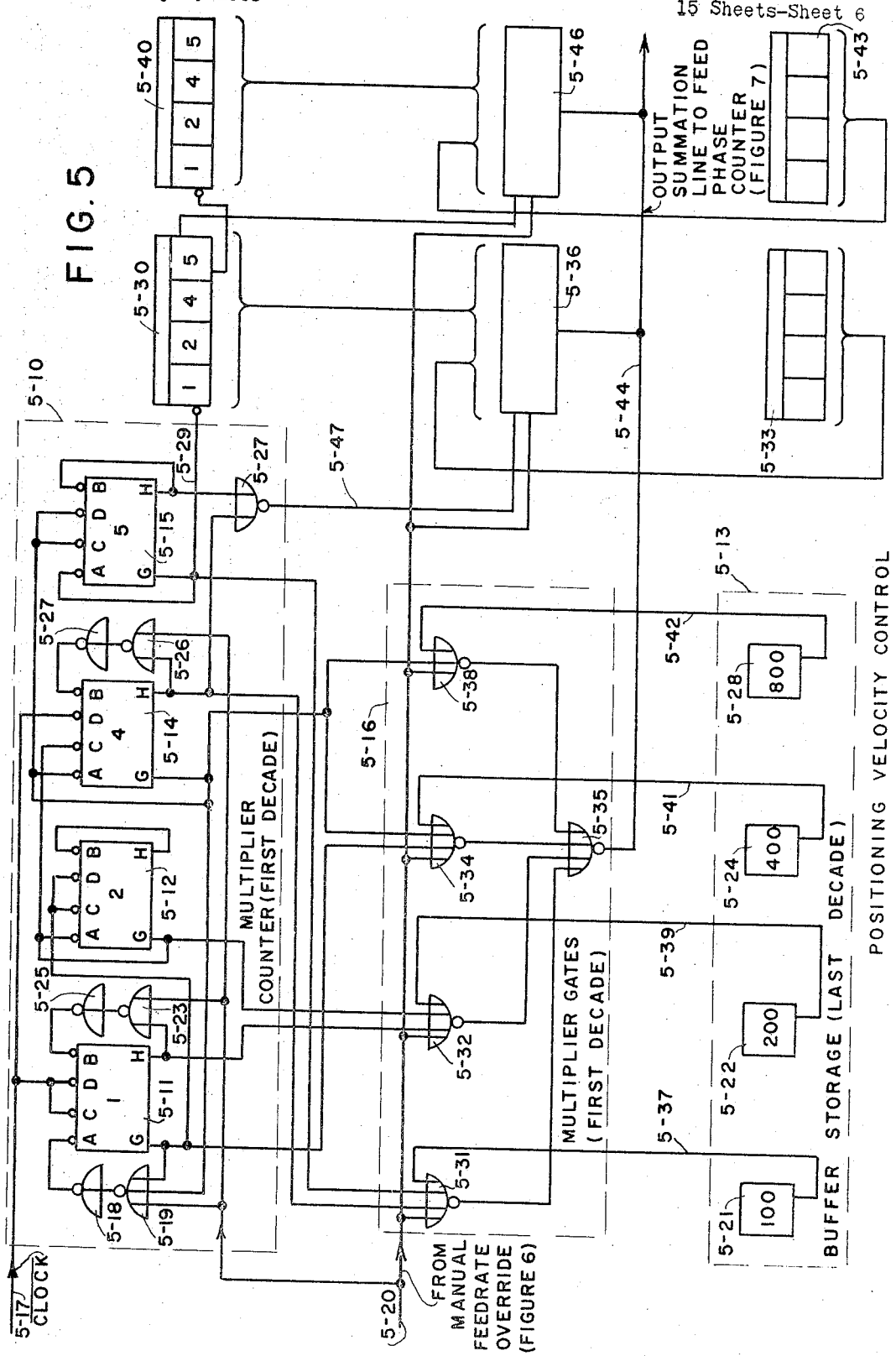

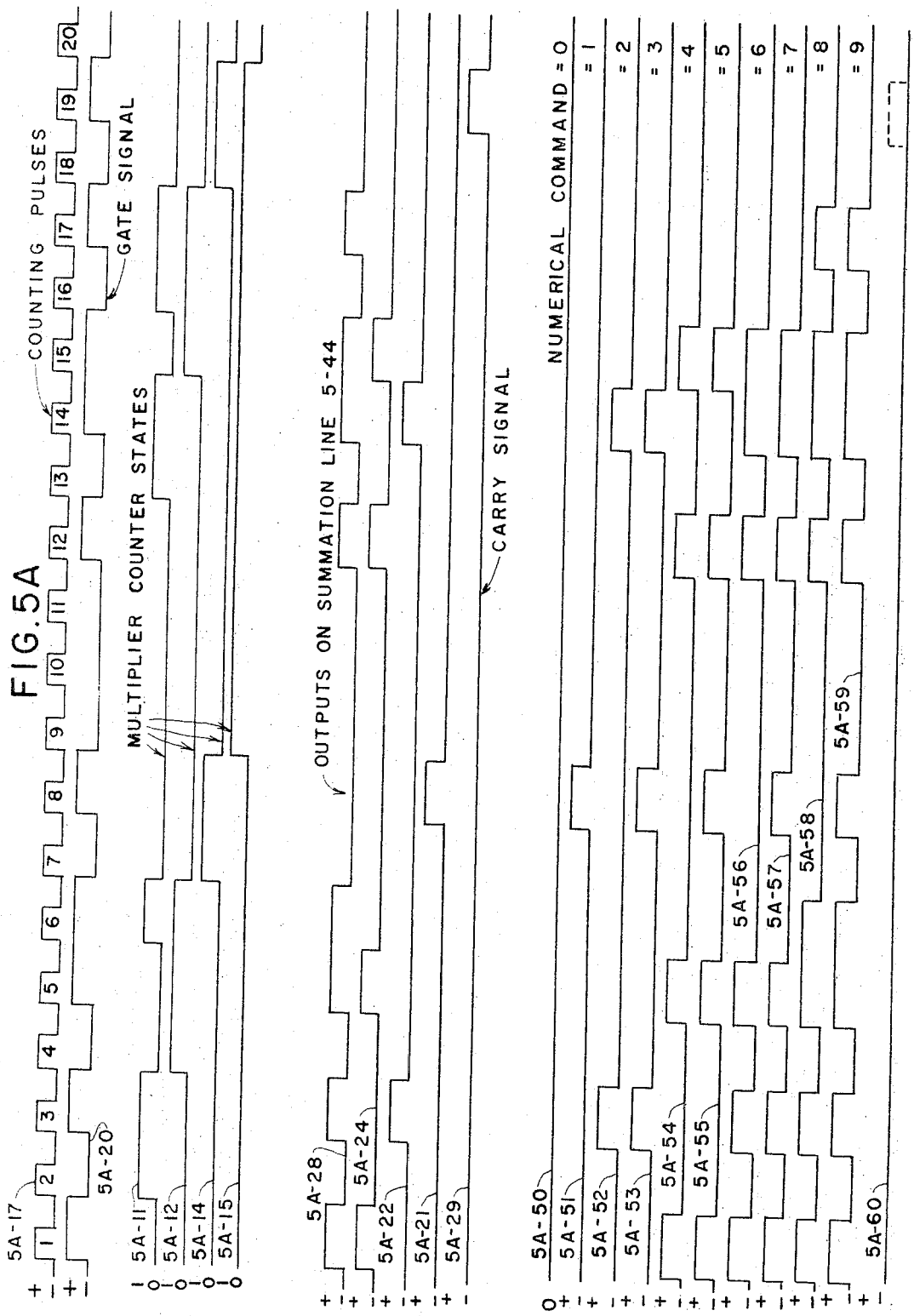

Oct. 24, 1967   J. T. EVANS   3,349,229
APPARATUS TO PERMIT BOTH CONTOURING AND NUMERICAL
POSITIONING OPERATIONS WITH A COMMON
CONTROL SYSTEM
Filed July 8, 1963    15 Sheets-Sheet 8

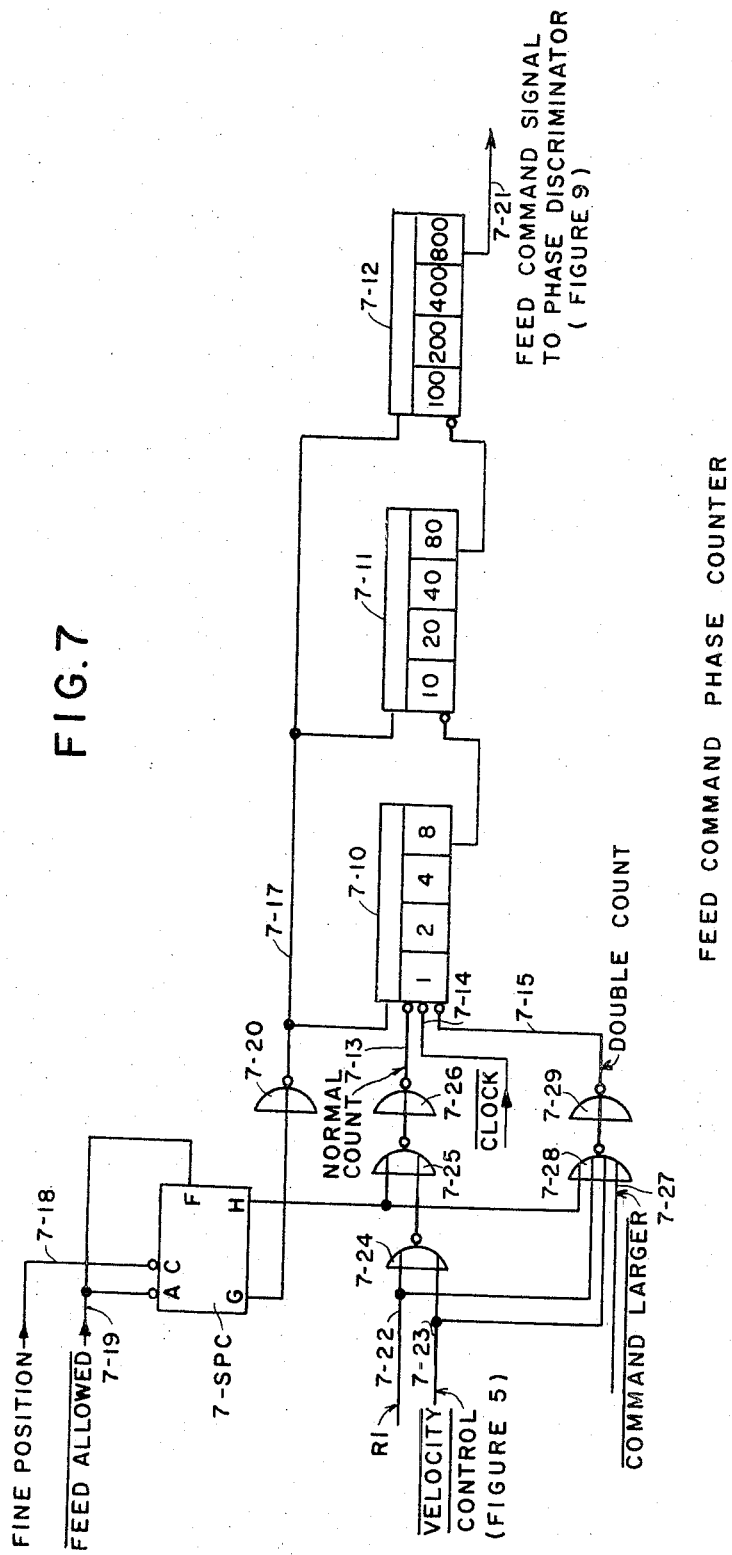

Oct. 24, 1967  
J. T. EVANS  
3,349,229  
APPARATUS TO PERMIT BOTH CONTOURING AND NUMERICAL POSITIONING OPERATIONS WITH A COMMON CONTROL SYSTEM  
Filed July 8, 1963  
15 Sheets-Sheet 10
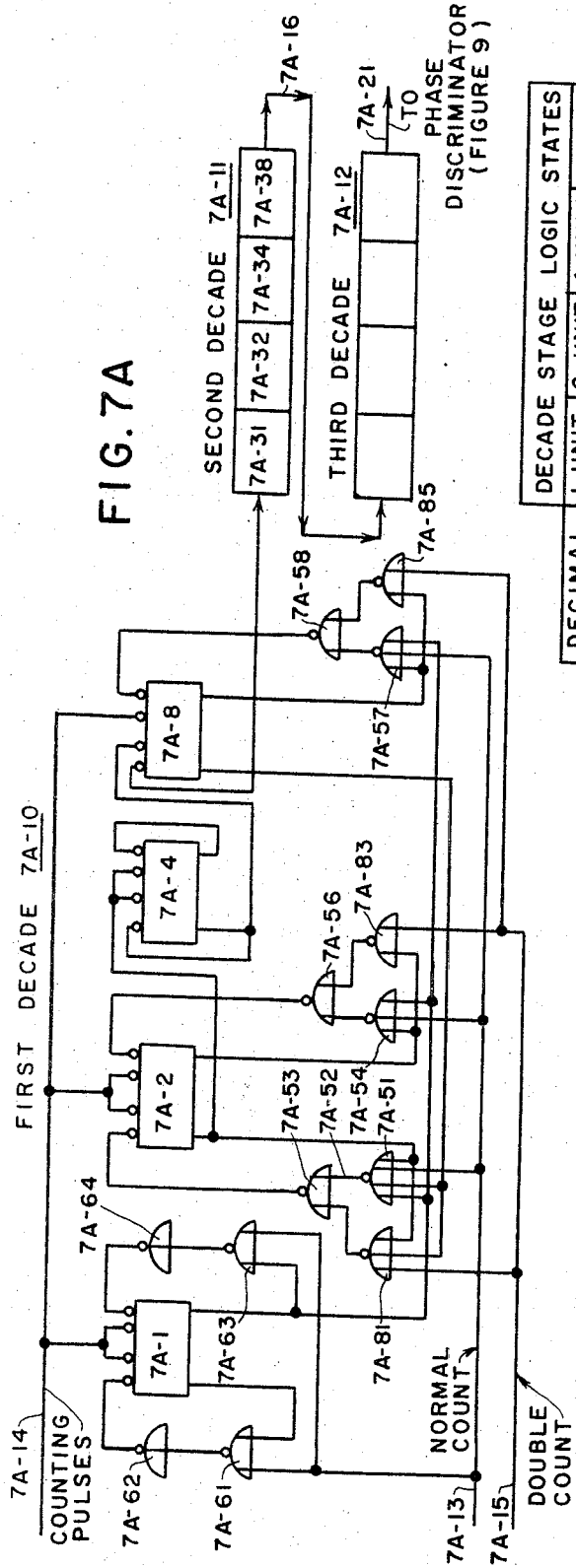
FIG. 7A
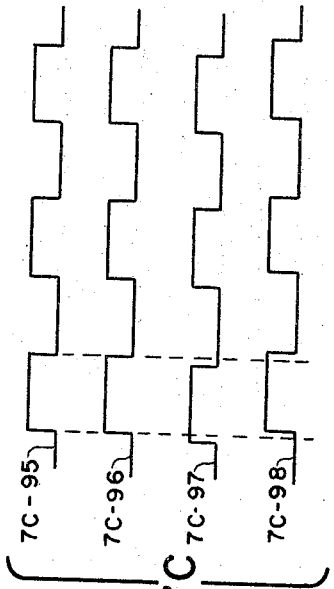
FIG. 7B
| DECIMAL NUMBER | DECADE STAGE LOGIC STATES | | | |
|---|---|---|---|---|
| | 1-UNIT STAGE | 2-UNIT STAGE | 4-UNIT STAGE | 8-UNIT STAGE |
| 0 | 0 | 0 | 0 | 0 |
| 1 | — | 0 | 0 | 0 |
| 2 | 0 | — | 0 | 0 |
| 3 | — | — | 0 | 0 |
| 4 | 0 | 0 | — | 0 |
| 5 | — | 0 | — | 0 |
| 6 | 0 | — | — | 0 |
| 7 | — | — | — | 0 |
| 8 | 0 | 0 | 0 | — |
| 9 | — | 0 | 0 | — |
FIG. 7C

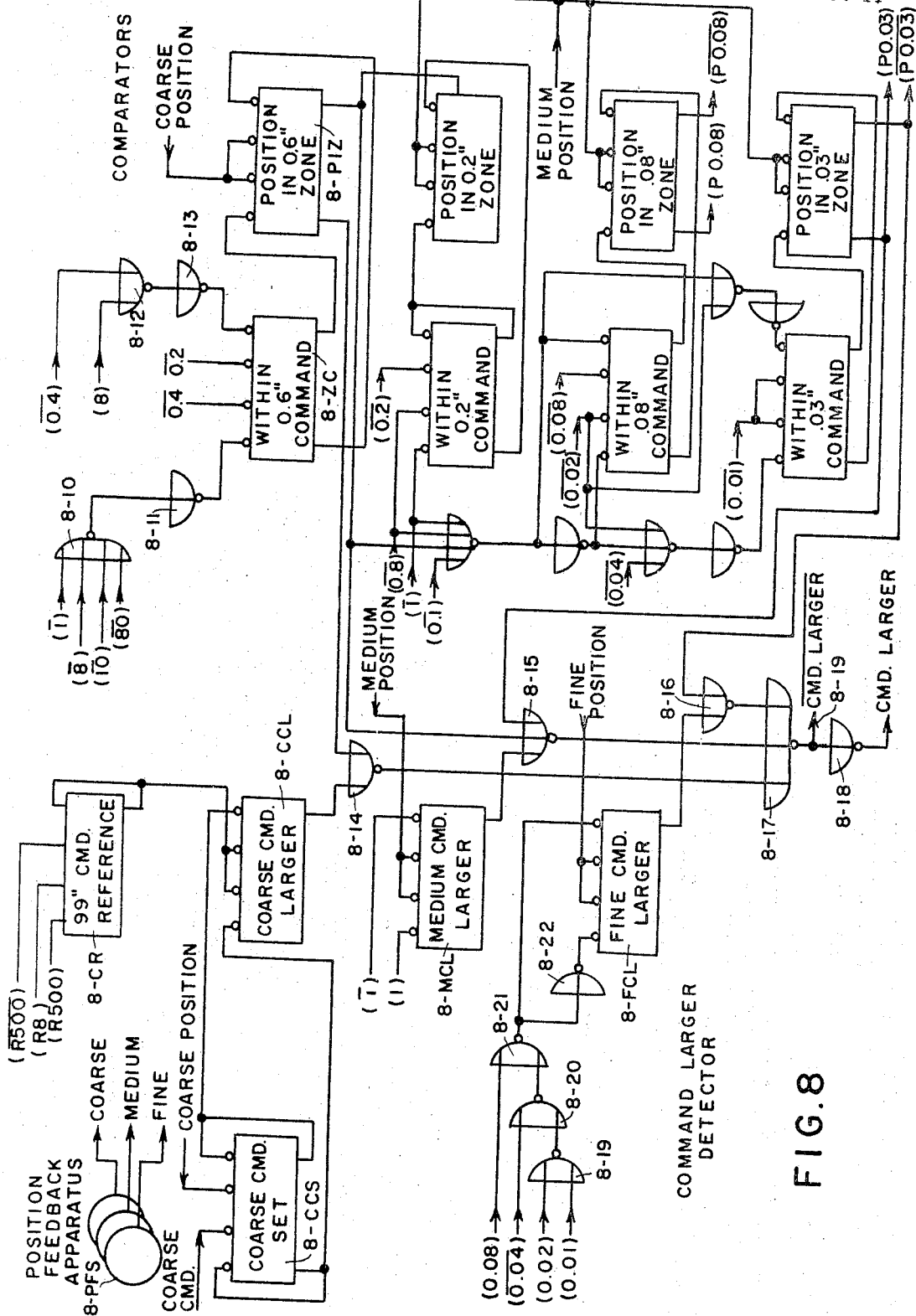

Oct. 24, 1967  J. T. EVANS  3,349,229
APPARATUS TO PERMIT BOTH CONTOURING AND NUMERICAL
POSITIONING OPERATIONS WITH A COMMON
CONTROL SYSTEM
Filed July 8, 1963  15 Sheets-Sheet 12

FEED ALLOWED CIRCUIT

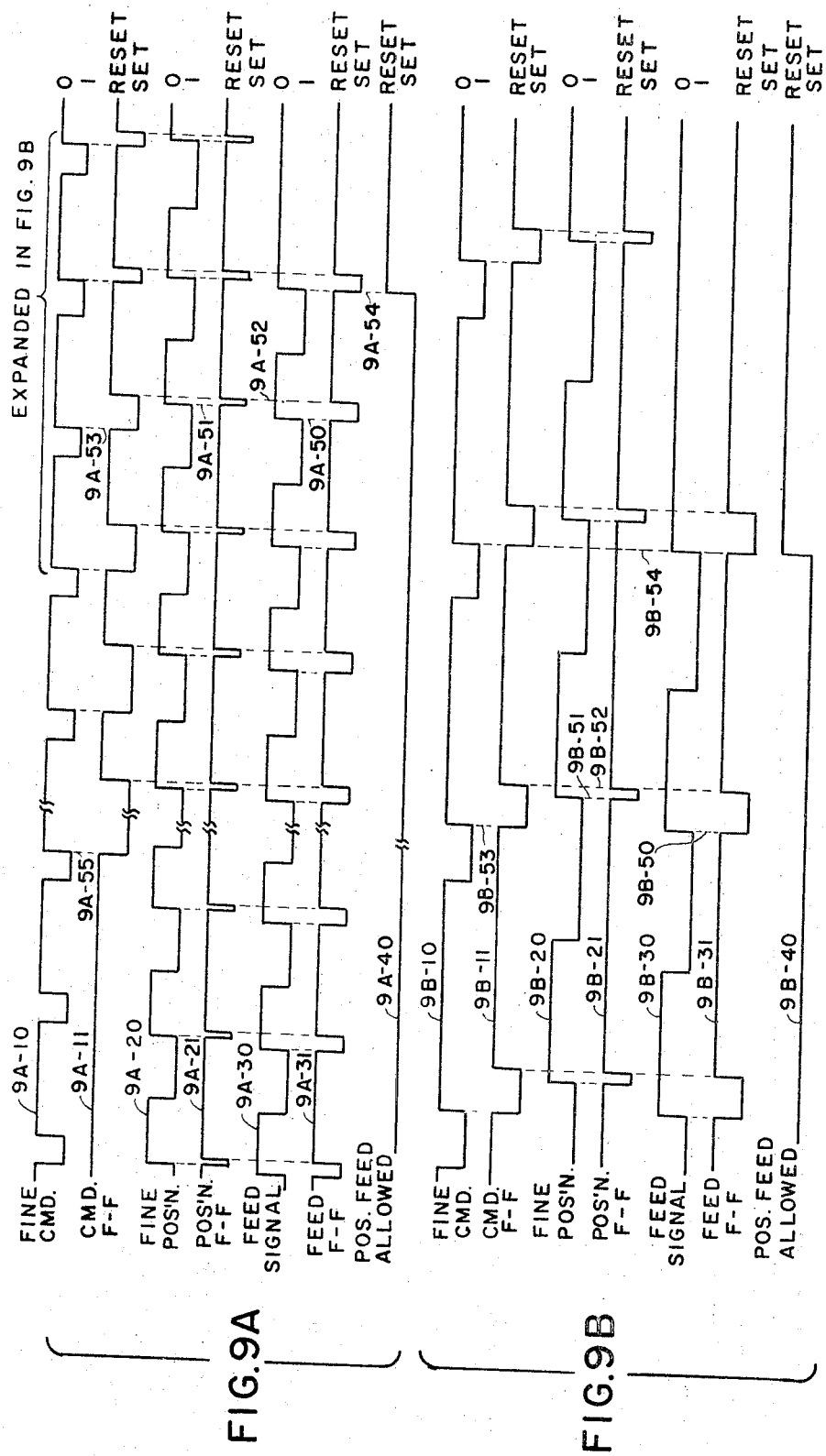

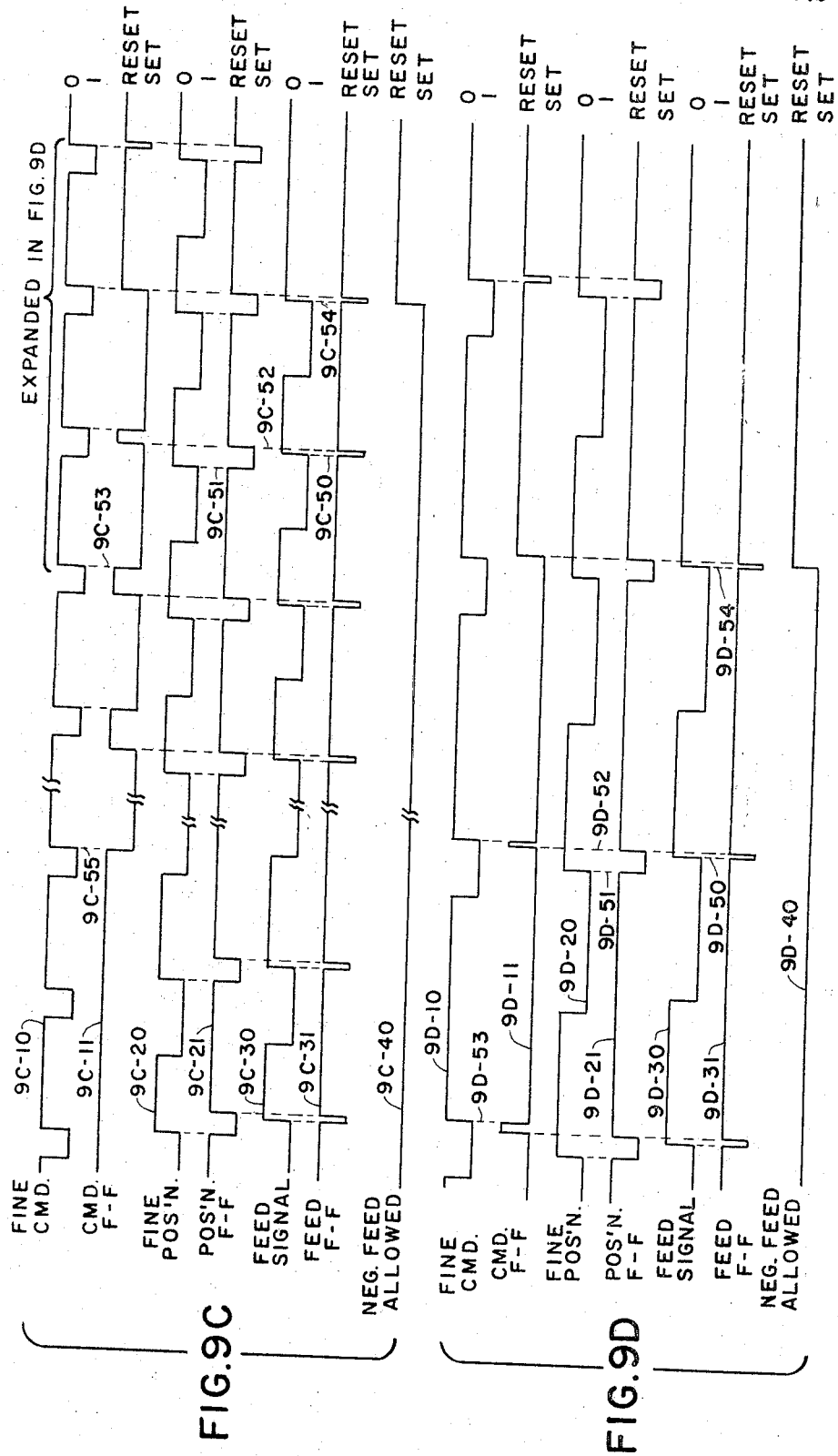

United States Patent Office
3,349,229
Patented Oct. 24, 1967

3,349,229
APPARATUS TO PERMIT BOTH CONTOURING AND NUMERICAL POSITIONING OPERATIONS WITH A COMMON CONTROL SYSTEM
John T. Evans, Waynesboro, Va., assignor to General Electric Company, a corporation of New York
Filed July 8, 1963, Ser. No. 293,384
16 Claims. (Cl. 235—151.11)

This invention relates to electronic automatic control systems, and more particularly, to numerical control systems for controlling the positioning of a cutting element of a machine tool relative to a workpiece.

Heretofore, machine tool control equipment has been considered to fall into the separate categories of "Numerical Contouring Control" systems and "Numerical Positioning Control" systems. Numerical Positioning Control primarily differs from Numerical Contouring Control because positioning solely requires a command containing information as to the ultimate location of a workpiece relative to a cutting element, whereas contouring requires commands containing information as to the rate of speed and the instantaneous direction of motion of a workpiece relative to a cutting tool. The present invention relates to equipment designed to permit both contouring operations and numerical positioning operations with a common control system.

Accordingly, an object of the present invention is to provide unique means operative to position apparatus in response to absolute positioning data and to afford controlled feed rate between a present position and a new position in order to accomplish contouring operations.

Although a large number of systems have been developed for numerical control of positioning apparatus, the present invention belongs to that class of numerical control systems wherein the commanded position of the apparatus and the actual position of the apparatus are accurately represented by the phase of a command and position signal, respectively. In this class of system, the apparatus is positioned in accordance with the difference in phase.

In general, the control data which determines the final position of the equipment and the speed with which the equipment must move to attain that position, is presented to the control system in numerical form programmed on punched tape or punched cards; although in certain applications, magnetic tape containing the digital information may be used. The numerical input data is routed to appropriate subsections of the control system, wherein the control function is set into operation. In order that the numerical information be utilized by the electronic control equipment, the input data must be presented in an electrical form compatible with the over-all system and which will enable the control system to accurately control the speed and ultimate position of the machine tool relative to the workpiece. One form of representation of the position of equipment is a phase-coded signal having a discrete phase displacement with respect to a reference signal. With this form of representation, speed is represented by the rate at which the phase of such a signal is varied.

In typical Numerical Contouring Control systems, the velocity of motion is determined by the rate of phase change of a pulse train and the distance to be traveled is determined by the number of pulses in the train. In typical Numerical Positioning Control systems, the commanded position is represented by the phase difference between a command signal and a reference signal, each of which are generated in response to pulse trains. In contradistinction to these systems, in the present invention, position is represented by the phase of a first command and the velocity of motion in attaining the position is represented by the rate of phase change of a second command.

Another object of the present invention is to provide numerically controlled equipment for generating a first and a second command for respectively establishing a preselected apparatus position and the rate at which the apparatus is to proceed while attaining the preselected position.

It is found advantageous to permit an operator to selectively determine whether the apparatus should position (1) in accordance with a fixed velocity program, (2) in accordance with a controlled velocity program (e.g., by taped commands), or (3) in accordance with a modified version of a controlled velocity program. Thus, if the positioning capabilities only of the controlled machine are being used on a particular job, operation (1) may offer the most efficient utilization of the machine's capabilities. On the other hand, if the job requires certain machining to take place while the machine is being positioned from a first to a second location, operation (2) becomes almost a necessity. Further, although a controlled velocity program may be available, there are times when a trained operator can recognize the need for a variation in the commanded velocity in order to insure proper functioning of all equipment involved. It is in the latter situation that operation (3) provides an important feature.

Another object of the invention is to provide an improved numerical control system wherein equipment may be accurately positioned either in accordance with a fixed velocity program, a controlled velocity program, or a modified controlled velocity program.

In the system described hereinafter, a sensing mechanism observes the position of the machine tool as the machine tool responds to command signals, and generates a signal whose phase relative to the reference is representative of the actual position of the machine tool. The desired position the machine tool is to assume is represented by the phase difference between a first command signal and this feedback signal. The velocity with which the machine is to traverse the distance from its initial position to the desired position is represented by the rate of change of phase of a second command signal which is initially synchronized with this feedback signal.

In effect, two control circuits are used for each controlled motion. In a first of these control circuits, the ultimate position is determined by means for comparing the feedback signals with a position command signal. This comparison generates an error signal which may be used to command automatic traverse to the commanded position in accordance with a predetermined rate program. In the second control circuit a controlled velocity program is implemented by means for generating a feedrate-position command signal which is initially in phase with the feedback signal and thereafter varying this feedrate-position command signal at a rate commensurate with any desired velocity.

Another object of the present invention is to provide equipment with cooperating control circuits for one or more axes of motion which determine both the final position of a machine element and the rate of traverse thereto.

When the position an apparatus is to assume and the velocity of motion it is to use to attain that position are represented by independent signals, it is necessary to recognize when the apparatus has moved into proximity with the commanded position and remove the velocity control before the apparatus passes the position. Simple positioning is accomplished by automatically moving the apparatus at a fixed traverse rate until it comes within a predetermined zone surrounding the commanded position and then decelerating at a rate proportional to the error within the zone. Velocity controlled positioning is accomplished herein by moving the apparatus at the controlled velocity until within the described predetermined zone and even thereafter, until the controlled velocity is equal to the velocity dictated by the position error.

Still another object of the present invention is to provide improved means for selectively controlling the positioning rate of a machine element until the velocity is equal to a velocity commanded by the actual position error and thereafter automatically imposing a positioning rate proportional to the difference between the actual position and the commanded position.

In accordance with the present invention, velocity controlled operation is implemented by generating a feedrate-position command signal in synchronism with the feedback signal representing the current position of the apparatus and varying the phase of this feedrate-position command signal at a rate commensurate with the desired apparatus feedrate. During such operation, the apparatus responds to the comparison between the feedrate-position command signal and the feedback position signal and approaches the desired position at the described rate. Once the apparatus attains a position within a predetermined zone surrounding the desired position and when the feedrate-position signal and command position signal are synchronized, the control over the rate of apparatus positioning is relinquished to the position error as determined by a comparison of the command position signal and the feedback position signal. This type of control insures more accurate control over apparatus movement than has heretofore been attainable with prior velocity control systems.

The novel features of the invention are set forth with particularity in the appended claims. The invention itself, however, both as to its organization and method of operation, together with further advantages and features thereof, may best be understood by reference to the following description taken in conjunction with the accompanying drawings of an illustrative embodiment of the invention wherein:

FIGURES 3A through 3H illustrate conventional logic symbols used in the following circuit schematics and truth tables for describing the operations performed by the circuits represented;

FIGURE 4 is a logic schematic of circuitry for generating reference signals and position command signals;

FIGURE 5 is a logic schematic of a Positioning Velocity Control circuit for developing a pulse repetition rate commensurate with a numerical command;

Figure 6:
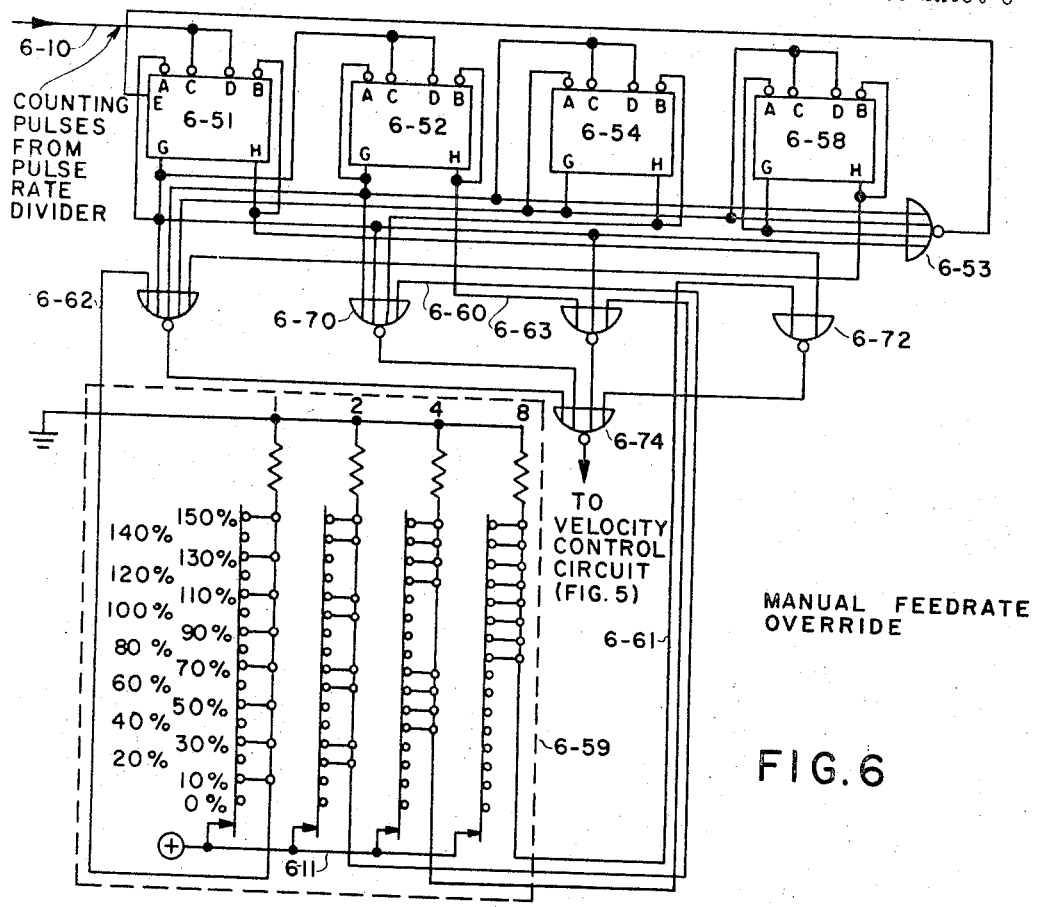
Figure 6A:
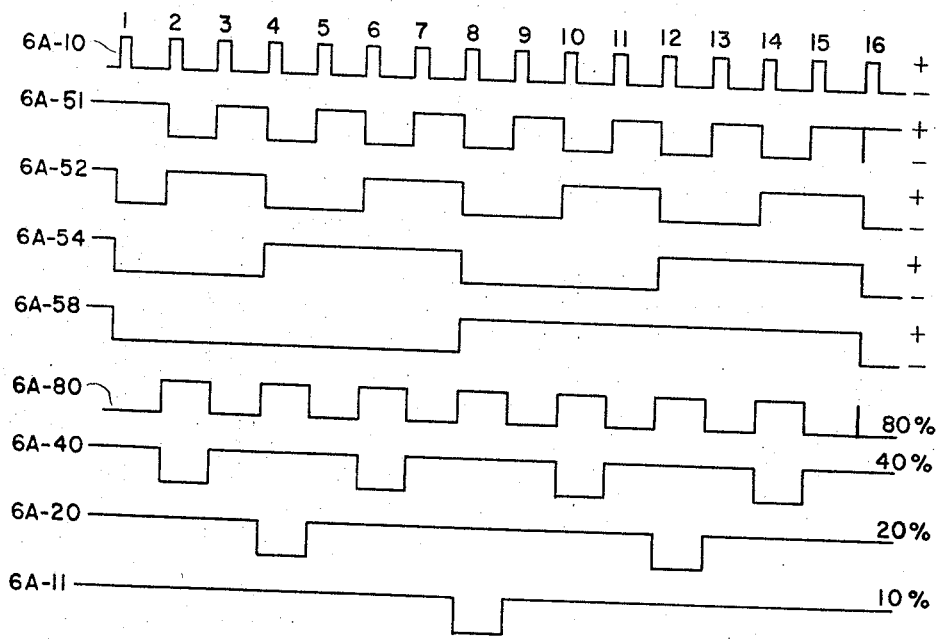
Figure 8A:
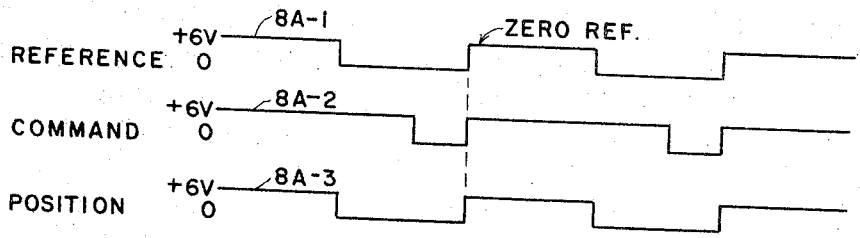
Figure 8B:
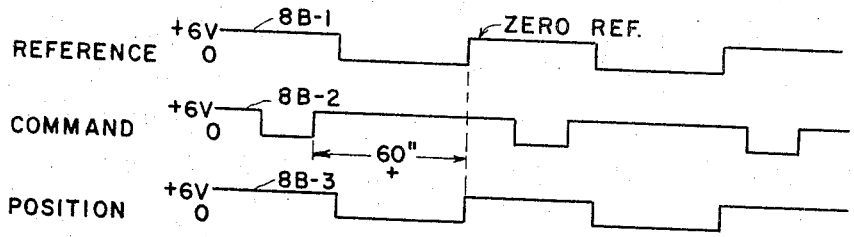
Figure 8C:
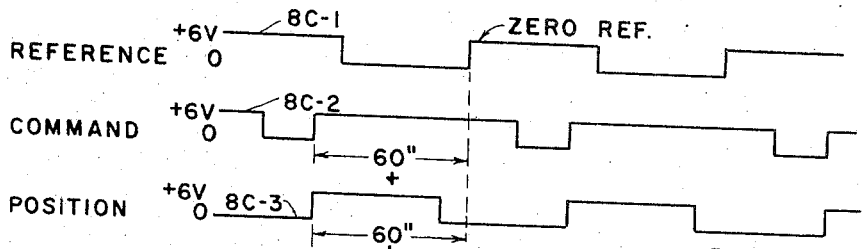
Figure 10:
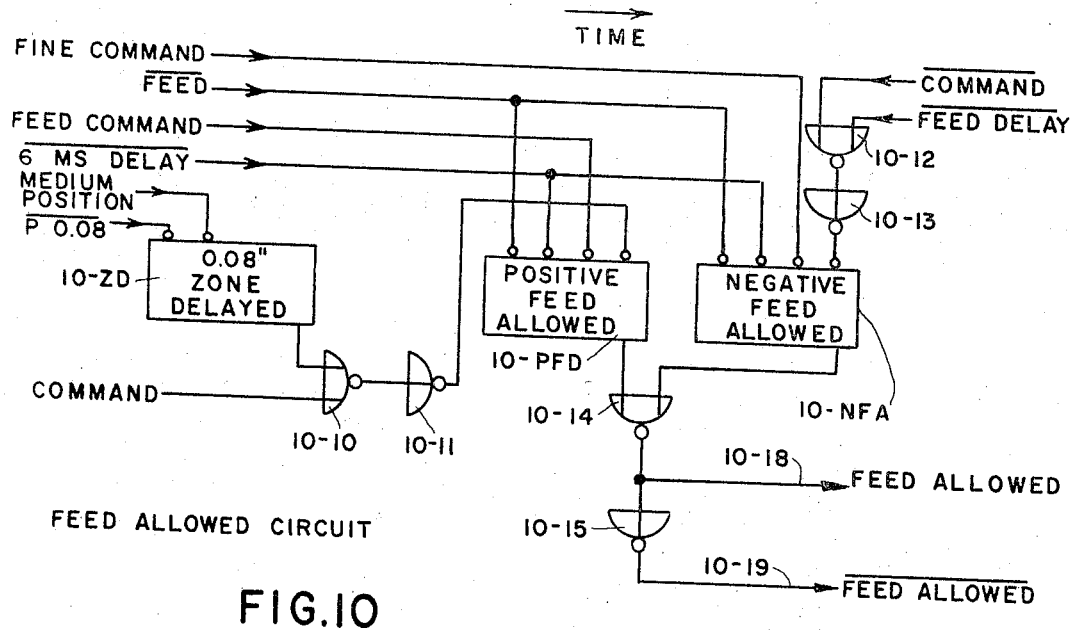
Figure 9:
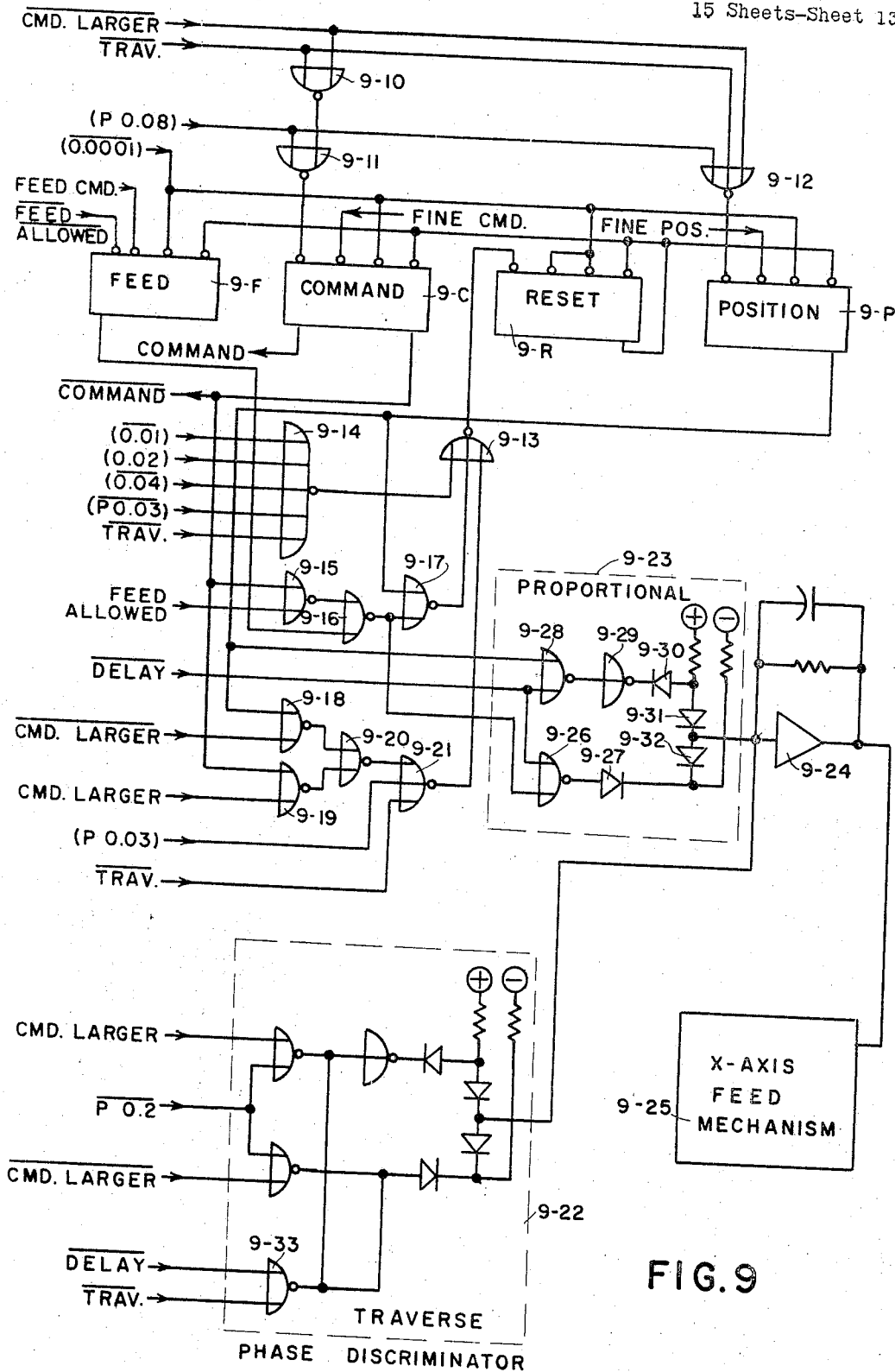

FIGURE 5A comprises timing diagrams descriptive of the Positioning Velocity Control circuit operation;

FIGURE 6 is a logic schematic of a Manual Feedrate Override circuit for manually modifying the output pulse repetition rate from the Positioning Velocity Control circuit in steps of 10%;

FIGURE 6A comprises timing diagrams descriptive of the operation of the Manual Feedrate Override circuit;

FIGURE 7 is a general logic schematic of a Feed Command Phase Counter for generating a phase-coded command signal that varies in phase at a rate commensurate with the commanded positioning velocity;

FIGURE 7A is a more detailed logic schematic of a Feed Phase Counter;

FIGURE 7B comprises a truth table illustrating the permutations of state of a typical count-up binary-coded decimal decade;

FIGURE 7C is a timing diagram illustrating the operation of a Feed Command Phase Counter;

FIGURE 8 is a logic schematic of circuitry for detecting the relationship between the command and position signals and for detecting the presence of the apparatus within a number of zones surrounding the commanded position;

FIGURES 8A, 8B, and 8C comprise timing diagrams for use in conjunction with an explanation of the system control circuitry;

FIGURE 9 is a logic schematic of a Phase Discriminator that generates feed signals for controlling the velocity with which the feed mechanism drives the apparatus;

FIGURES 9A, 9B, 9C, and 9D comprise timing diagrams descriptive of the operation of the Phase Discriminator under selected conditions; and FIGURE 10 is a logic schematic of a Feed Allowed Circuit for detecting synchronism between the position command signal and the velocity command signal.

In order to provide a succinct description of an embodiment of the invention, a number of individual subcircuits are hereinafter described in detail in conjunction with specific figures. The entire control system will first be generally described and thereafter the operating components of the system which are believed to require explanation in order to permit one skilled in the art to practice the invention are treated in greater detail. The specification is arranged in accordance with the following table of contents:

TABLE OF CONTENTS

| | Column |
|---|---|
| General Description | 1 |
| Detailed Description | 10 |
| Circuit Symbology | 10 |
| Position Command Signal Generation (FIG. 4) | 12 |
| Positioning Velocity Control Circuit (FIGS. 5, 5A) | 14 |
| Manual Feedrate Override (FIGS. 6, 6A) | 17 |
| Feed Command Phase Counter (FIGS. 7, 7A, 7B, 7C) | 19 |
| Phase Comparators and Command Larger Detector (FIGS. 8, 8A, 8B, 8C) | 26 |
| Discriminator—Automatic Positioning Operation (FIG. 9) | 31 |
| Discriminator—Velocity Controlled Operation (FIGS. 9, 9A, 9B, 9C, 9D) | 35 |
| Feed Allowed Circuit (FIG. 10) | 37 |
| Summary and Claims | 39 |

GENERAL DESCRIPTION

Figure 1:
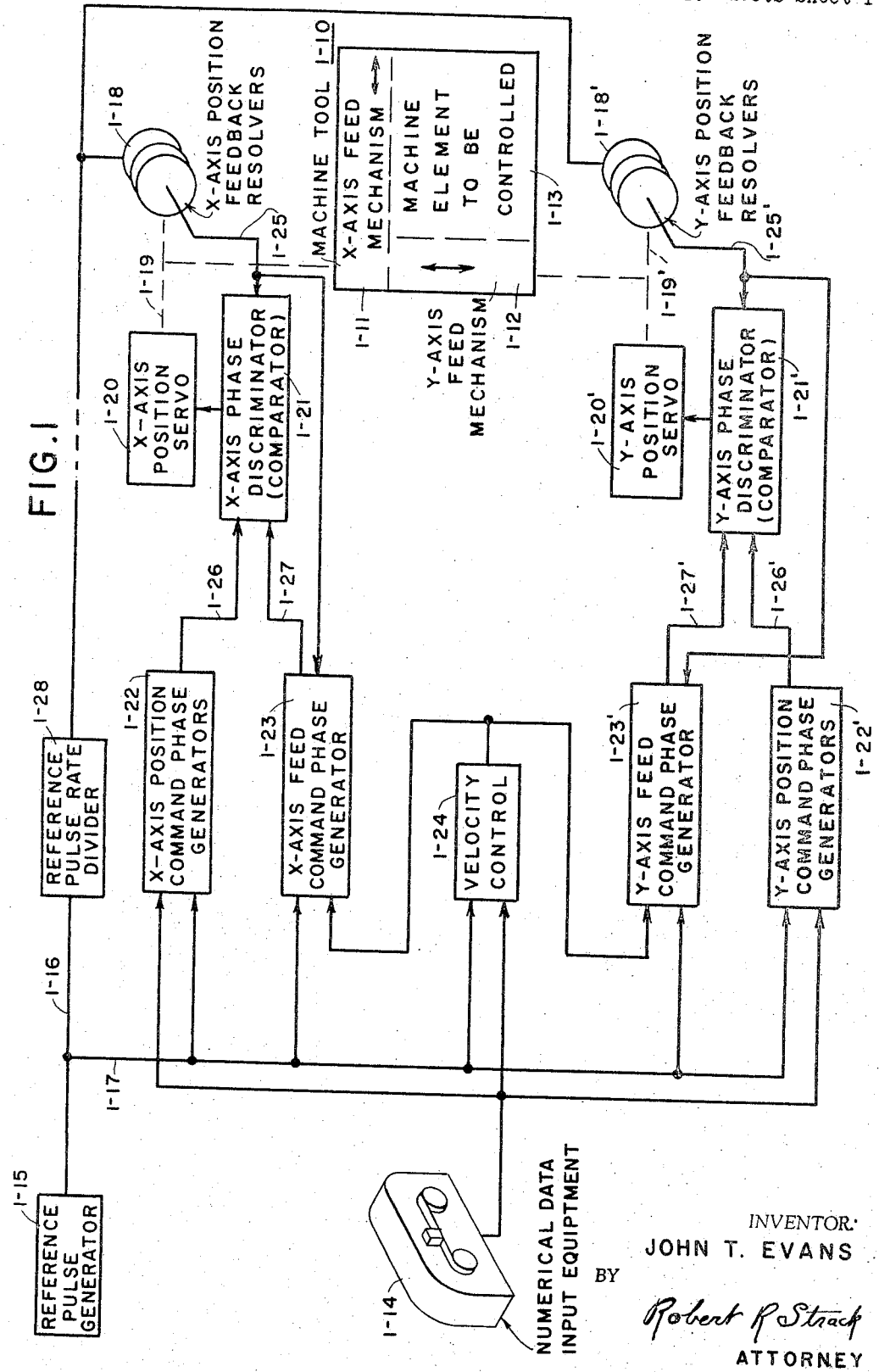
FIGURE 1 is a general block schematic showing the basic components present in a numerical control system embodying the features of the invention.

FIGURE 1 contains a general block diagram of a control system of the nature contemplated. For convenience, the machine tool to be controlled is illustrated by a block 1–10 at the right central portion of the figure. It should be understood that the teachings of the invention are applicable to any machine control wherein the positioning of an operating machine element with respect to a workpiece is of importance.

The function of the entire system, as illustrated in FIGURE 1, is to control machine tool 1–10 automatically in response to numerical data read from the numerical data input equipment 1–14 appearing on the left of the figure. Machine tool 1–10 comprises the machine element 1–13 to be controlled by the control section, the X-axis feed mechanism 1–11, and the Y-axis feed mechanism 1–12. The feed mechanisms 1–11 and 1–12 comprise appropriate drive shafts and gearing which actuate machine element 1–13 for motion along the X and Y axes. Obviously, the system may be utilized for controlling machine elements in additional coordinates, but to simplify the explanation of the principles of the invention, a description of the third coordinate has been omitted. Machine element 1–13 may be the cutting tool itself or it may be the table holding the workpiece which is to be operated upon. Alternatively, feed mechanisms 1–11 and 1–12 may control both the cutting tool and the motion of the workpiece. For purposes of this discussion, it will be assumed that the machine element 1–13 represents the cutting tool.

All actions of the machine 1–10 are under the control of numerical data input equipment 1–14. For purposes of illustration, a punched tape input has been selected. Of course, other appropriate means may be used for presenting numerical data and these are also contemplated.

A block of information on the punched tape, in accordance with the system to be described, contains all of the information necessary for a positioning and feeding operation. The data is presented in words, each of which has a letter address as the initial character. The characters in each word are made up of a plurality of simultaneously read elements encoded in the well known binary form. An example of a word calling for a position on the X-axis might be X123456, where each of the characters is represented in binary form. The letter address "X" indicates that the following numerical characters represent a position on the X-axis. Consequently, when this letter address is detected, the following numerical characters are routed to the X-axis control section of the control system for generation of command signals.

In accordance with the velocity control features of the present invention, data words are also presented which indicate the velocity with which the machine tool element 1–13 is to move with respect to the workpiece. The word designating the particular velocity desired is also made up of a plurality of characters presented in binary form. Thus, a complete command for one axis of motion includes a word commanding a desired position and a word commanding the rate at which machine tool element 10–13 is to move in order to attain that position.

Generally speaking, the position data is used to control a position command phase generator such as X-axis position command phase generator 1–22 and the velocity data is used to control a feed command phase generator such as X-axis feed command phase generator 1–23. The position command generator 1–22 functions to provide a command signal whose phase with respect to a reference signal from a pulse rate divider 1–28 represents the desired position machine element 1–13 is to assume. The feed command generator 1–23 functions to provide a command signal which is initially in phase with a signal representing the instantaneous machine position and continuously changes at a rate commensurate with the desired velocity of traverse.

Before proceeding with a consideration of the processing of input data to develop command signals, it is worthwhile to consider the servo loops which are involved in the control of each axis of motion of the machine control element 1–13. The X-axis and Y-axis servo loops are structurally and electrically independent of each other in their action of driving the feed mechanism. Since the equipment throughout the system for the X-coordinate is precisely the same as for the Y-coordinate, solely the X-coordinate control section will be described. As shown in FIGURE 1, corresponding elements of the Y-axis control section have been given the same numerical designation as those of the X-axis control section. They are distinguished by a prime signal (').

The X-coordinate servo loop comprises an X-axis position servo 1–20, including a DC amplifier driving a servo motor which by its output shaft 1–19 controls a feed motor control to actuate the X-axis feed mechanism 1–11. Simultaneously, position servo shaft 1–19 drives the X-axis multiple range position feedback resolvers 1–18. The output leads 1–27 of the multiple range position feedback resolvers provide an electrical representation of the position of the machine in the X-coordinate since both the feed mechanism 1–11 and the multirange position feedback resolvers 1–18 are driven in common by the position servo 1–20. Leads 1–25 are coupled into the X-axis phase discriminator 1–21. The function of the X-axis phase discriminator is to compare the position signal applied over lead 1–25 with command signals on leads 1–26 and 1–27 from the X-axis position command phase generators 1–22 and the X-axis feed command phase generator 1–23, respectively. By comparing the phases of the command signals and the feedback position signal, an error signal is developed which is fed into the servo 1–20 for driving the X-axis feed mechanism.

A fundamental element in a phase control system such as contemplated herein is the reference pulse generator 1–15. This generator produces a train of pulses having a predetermined repetition rate. It provides the carrier by which the command signals are transported throughout the control section; it is also used to develop synchronized pulse trains of selected repetition rates for use throughout the control system. Thus, the output of reference pulse generator 1–15 is applied via lead 1–16 and pulse rate divider 1–28 to the multiple range position feedback resolvers 1–18 and is also applied over lead 1–17 to the command phase generators 1–22 and 1–23.

The output of pulse rate divider 1–28 represents a standard signal and the phase deviation between this standard signal and the output of the X-axis position command phase counter 1–22 represents the absolute position the machine element 1–13 is to assume with respect to a predetermined reference point. The standard signal at the output of pulse divider 1–28 is applied to the X-axis position feedback resolvers 1–18 (via known adapting circuitry which is omitted for brevity) which impart to it a phase shift that is commensurate with the instantaneous position of machine element 1–13. The output of feed command phase counter 1–23 is initially synchronized with this position signal and thereafter varies in phase at a rate determined by the input data and commensurate with the velocity at which the machine element is to move.

Two distinct types of operation are possible with the control system shown in FIGURE 1. In a first type of operation, the numerical data input equipment 1–14 supplies position data to the X-axis position command phase generators 1–22 which thereupon generate phase-modulated outputs on lead 1–26 representative of the commanded position. The X-axis phase discriminator 1–21 functions in response to these command signals and the position signals and the position signals on lead 1–25 to drive the X-axis position servo 1–20 in accordance with a predetermined rate program until correspondence between the command and position signals occurs. At this time, machine element 1–13 is positioned in accordance with the input data.

As already noted, one of the unique contributions of the present invention is the ability to in effect perform contouring operations with equipment compatible with the above-described positioning operations. This is accomplished by presetting a velocity control circuit 1–24 with data indicative of the velocity with which machine tool element 1–13 is to be moved. Under the control of velocity control circuit 1–24, X-axis feed command phase generator 1–23 develops a phase-modulated output on lead 1–27, the phase of which varies with respect to the output of pulse rate divider 1–28 at a rate representative of the velocity with which the equipment is to move. In this mode of operation, the X-axis phase discriminator 1–21 drives the X-axis position servo 1–20 at a velocity determined by this rate of change until a position in proximity to the desired end position is attained. At that time, upon correspondence between the output of feed command phase generator 1–23 and the controlling position command phase generator 1–22, phase discriminator 1–21 directs final positioning in accordance with the phase difference between the outputs of the position command phase generator and the corresponding position feedback resolver 1–18.

Figure 2:
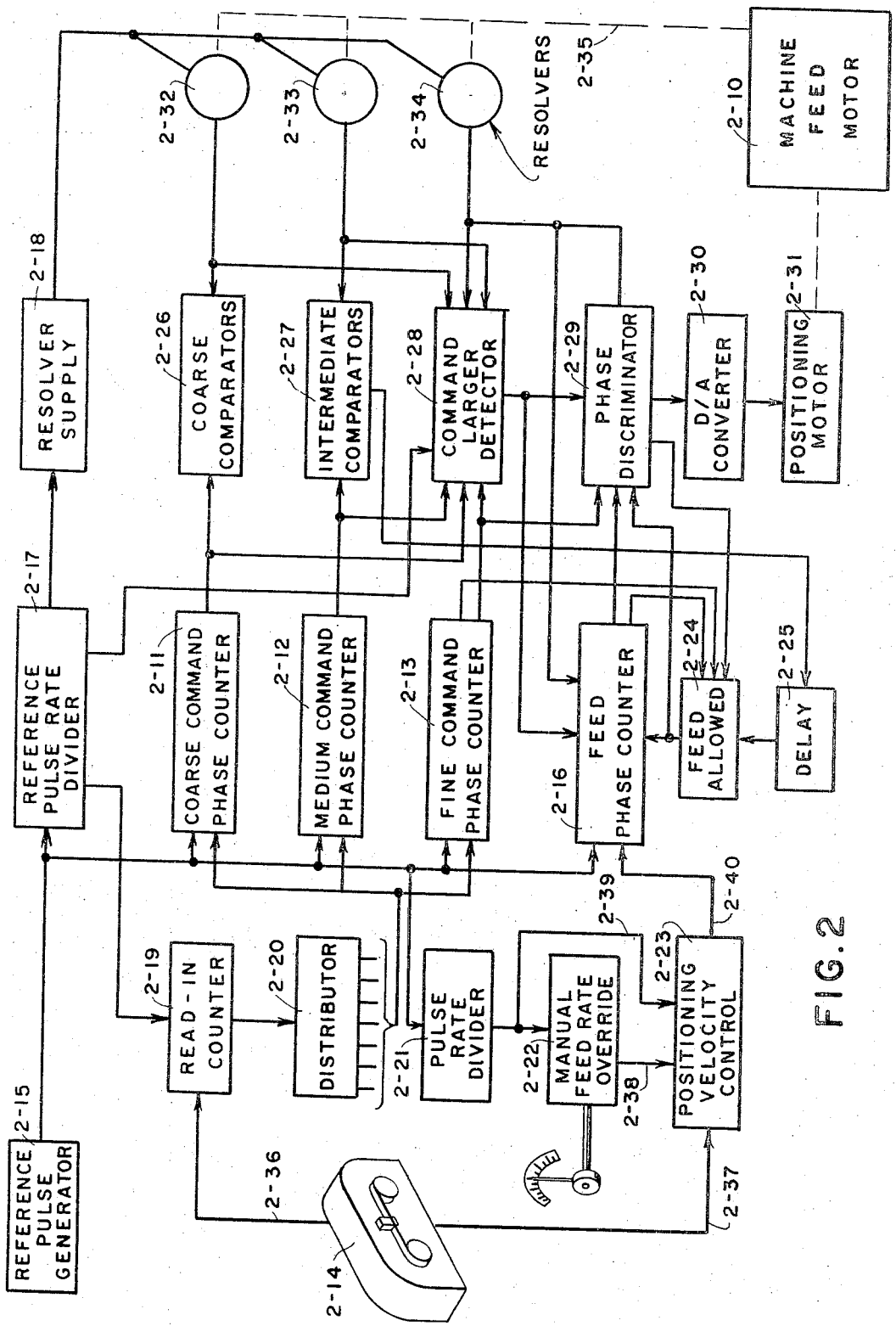
FIGURE 2 is a somewhat more detailed block schematic drawing illustrating the general components employed in providing the novel features of the invention as embodied in the control section for a single axis of machine motion.

A more complete understanding of the unique features of the invention may be gleaned from a consideration of the more detailed block schematic in FIGURE 2. This block schematic illustrates the control equipment which would be used for controlling a single axis of machine motion. The command phase generators 1–22 and 1–23, the phase discriminator 1–21, and the position feedback resolvers 1–18 have been shown in terms of their component parts. The description to follow will be concerned only with a single axis control system inasmuch as the other coordinates in motion are controlled by substantially similar circuitry.

With respect to FIGURE 2, and in understanding the following description, the numerical data input equipment 2–14 should be considered to comprise the various components of such equipment required to provide usable control data. For example, the input equipment might comprise a tape reader, a number recognition means for recognizing numerical characters, a letter recognition means for recognizing letter characters, and a sequencing or control means for developing the necessary sequencing signals required to control information read-in and circuit cycling in response to the input data. The particular manner in which such functions are implemented is not material to the invention herein and any of the suitable ways known in the art may be employed. In the following description it is assumed that control information for the illustrated axis control system has been presented and stored in the appropriate control sections.

In general, as new command data is presented by control tape equipment 2–14, the individual numerical characters are preset into a read-in counter 2–19. After being set, the read-in counter 2–19 operates to produce a series of pulses equal to the number preset therein. These pulses are steered by distributor 2–20 to the counting inputs of the appropriate decades of the command phase counters 2–11, 2–12, and 2–13. Three separate command phase counters are used to generate three components of the six digit position command assumed for use in the illustrated system. (Such a command signal will permit positioning over a range of 100 inches with an accuracy of 0.0001 of an inch.) Each command phase counter is a binary-coded count-up circuit operative to assume 1000 discrete permutations of output condition. Furthermore, each command phase counter comprises three separate decades which are operative in binary-coded-decimal form to count from 1 to 10. During this initial presetting phase of operation, the three least significant digits of the command are preset in fine command phase counter 2–13. The three most significant digits are preset in coarse command phase counter 2–11, and medium command phase counter 2–21 is preset with data derived from the intermediate four digits.

When all input data is preset into the command phase counters 2–11, 2–12, and 2–13, clock pulses are applied thereto from reference pulse generator 2–15. Assuming the pulses to have a repetition rate of 250 kilocycles per second, the counters will divide this input by 1000 and furnish 250 cycle per second square wave outputs. The phase of these output signals is displaced in proportion to the command number stored therein from a similar square wave output produced by a straight divide-by-1000 counter. The reference pulse rate divider 2–17 is in fact such a divide-by-1000 counter and consequently the phase differences between the outputs of phase counters 2–11, 2–12, and 2–13 and the output of pluse rate divider 2–17 represent the commanded position in a coarse, medium, and fine range, respectively.

In order to direct the positioning equipment, the control signals must be compared with corresponding signals representing the actual machine position. To develop such corresponding signals, the reference voltage ouptput from pulse rate divider 2–17 is applied via resolver supply 2–18 to multi-range position resolvers 2–32, 2–33, and 2–34. Resolver supply 2–18 converts the input thereto into suitable sine and cosine voltages for application to the orthogonally disposed windings of the resolvers. By way of example, the resolvers 2–34, 2–33, and 2–32 may be geared, as represented by dashed lines 2–35, to turn one revolution for each of the respective distances of machine travel 0.1 of an inch, 2.0 inches, and 100 inches, thereby generating a fine, medium, and coarse range of feedback data. In response to the excitation from resolver supply 2–18, each resolver produces a single phase output signal having a phase relative to its input that varies as a function of its shaft position. These outputs are easily converted to square waves by waveshapers (not shown) for comparison with the command signals in the corresponding ranges.

It has thus been established that coarse resolver 2–32 produces a 250 cycle per second signal having a phase representative of the apparatus position within a 100 inch range; medium resolver 2–33 produces a 250 cycle per second signal having a phase representative of the apparatus position within a 2 inch range; and fine resolver 2–34 produces a 250 cycle per second signal having a phase representative of the position of the apparatus within a 0.1 of an inch range. These signals are individually applied to coarse comparator 2–26, intermediate comparators 2–27, and phase discriminator 2–29, respectively. In addition, each of the signals from both the resolvers and the command phase counters is applied to a command larger detector 2–28 wherein the determination is made as to whether or not the equipment must be moved in a forward or reverse direction in order to attain the position commanded by the input data.

When numerical positioning solely is contemplated, and no contouring is desired, the positioning feed mechanism is driven at a constant rate of speed over the major portion of the distance to be traversed. For this reason, the generation of analog voltages proportional to the error between two widely divergent positions is generally unnecessary. In the illustrated embodiment as described more fully in connection with FIGURE 8, "end zones" are created within which special consideration is given to the phase difference between the particular command and position signals, and outside of which, only a basic determination is made of which direction of movement is required to attain a commanded position. For relatively large differences between the command and position signals, the coarse comparator 2–25 controls the feed mechanism to drive in either required direction at a predetermined constant rate of speed until the apparatus comes within a preselected coarse end zone. Within this zone, comparison of the medium command and position signals is made by intermediate comparators 2–27 to accurately determine the direction of traverse. Thereafter, when within a more sharply defined end zone, the fine command and feedback signals are compared in phase discriminator 2–29 to develop an analog signal having a magnitude proportional to the amount of error. In the positioning mode of operation; the machine feed mechanism and the control system are designed to cooperate completely without developing more information than is necesssary, and with the necessary information being developed as economically and efficiently as possible.

In order to perform contouring operations, it is necessary to control the velocity of movement of the machine element. The unique circuitry designed to control such operation effectively takes advantage of the fact that the velocity may be represented by a rate of change of phase of a command signal.

Under controlled velocity operation, the velocity or feedrate command is represented by a 250 cycle square wave which continually changes in phase at a rate determined by the velocity commanded. This signal is generated by means of a feed phase counter 2–16 which is, in effect, a divide-by-1000 command phase counter similar to the command phase counters 2–11, 2–12, and 2–13; but differing in that it is a variable rate counter which may be controlled to change its counting rate in accordance with desired conditions.

The pulse rate applied to feed phase counter 2–16 via lead 2–40 from the positioning velocity control 2–23 defines the commanded velocity with which the machine tool is to move. The function of the positioning velocity control circuit 2–23 is to convert a reference pulse rate, applied either directly from a pulse rate divider 2–21 on lead 2–39 or from a manual feedrate override circuit 2–22 on lead 2–38, into a pulse rate represented by a number (commensurate with the required velocity of motion) introduced into the system by input data equipment 2–14 via lead 2–37. This control number is therefore inserted from data equipment 2–14 into the positioning velocity control circuit 2–23 also. In the absence of a velocity command, as when only positioning is important, the output frequency from 2–23 is zero.

An example of the functioning of positioning velocity control circuit 2–23 is available by assuming that a feedrate of 20 inches per minute is commanded. In such a case, the circuit would operate upon the input pulse rate on lead 2–38 or 2–39 to provide an output pulse rate on lead 2–40 of 3.33 kilocycles per second (which is equal to 20 inches per minute with each pulse representing 0.0001 of an inch).

In the event an operator desires to modify this output rate, manual feedrate override circuit 2–22 permits selective modification of the input frequency or pulse rate and thereby affords means for manually performing what, in essence, positioning velocity control circuit 2–23 does automatically. In passing, it may be noted that pulse rate divider 2–21 may simply be a divide-by-5 pulse counter used to accommodate the velocity control section with the other equipment.

Returning to a consideration of the feed phase counter 2–16, it should be appreciated that, in essence, the output of feed phase counter 2–16 is a signal representing a position within the frame of reference of the system. During velocity controlled operation, phase discriminator 2–29 uses the "position" represented by this signal to command the positioning apparatus. This is accomplished by comparing the feedback signals from the resolvers with this "position" signal rather than with the command position signals. (A convenient name for this signal which is used hereinafter is "feedrate-position" signal.) By moving the "position" signal the positioning equipment is continually driven to attain a different goal, i.e. the "position" indicated, and the rate at which it seeks to attain this goal is determined by the rate at which the goal moves. Accordingly, feed command phase counter 2–16 must accept an input signal that is likely to be high (3 kilocycles per second or higher and develop a 250 cycle per second command signal that continuously changes in phase. It must also provide this phase shift in both positive and negative directions.

The direction of the phase shift is determined by the command larger detector 2–28 that makes continuing determinations of whether the commanded position is a larger or smaller dimension than the present position, in an absolute measuring sense. This comparison is made by means of flip-flops utilizing first the coarse, then the medium and then the fine command and position signals respectively, for a valid indication of the desired condition. Knowing which is larger, the necessary direction of travel is indicated and thus the direction of phase shift necessary in the feed phase counter 2–16. This information is also used in the phase discriminator 2–29 if the positioning mode of operation is solely involved.

Further means must also be included to utilize the phase shifting feedrate-positioning signal as an input to phase discriminator 2–29 during controlled velocity operation. The feed allowed circuit 2–24 is operative during velocity controlled operation in order to utilize the output of the feed phase counter 2–16 in place of those from the command phase counters 2–11, 2–12, and 2–13. The "end zone" detection circuitry, previously described, operates during the velocity controlled operation also, in order to discretely define the desired end point. Within 0.080 of an inch of the final position, a comparison is made between the fine command signal and the feed command signal and when synchronism is detected, further positioning is controlled at a rate proportional to the position error as defined by the phase difference between command and position signals. This insures a deceleration to zero at the commanded position from an initial rate as commanded by the velocity control signal. Inasmuch as it may take time in the neighborhood of 4 milliseconds to establish the operating conditions following the reading of new information, it is necessary to delay the feed allowed circuit 2–24 until the new command has been established lest a false direction or speed result because of incomplete transition to the new data. Accordingly, the delay circuit 2–25 is included to determine a proper starting time for a feed cycle, following the reading of new tape data.

With the general functioning of the proposed contouring position control system in mind, a more complete understanding will be available from a consideration of specific circuitry designed to perform the desired functions. Of course, equivalent elements may be substituted by those skilled in the art for the particular elements employed. For convenience and brevity of description, the following circuits are individually described in terms of the particular functions they perform. First, however, the circuit symbology used hereinafter will be explained.

DETAILED DESCRIPTION

Circuit Symbology

Several techniques have been used to make it easier to follow the operation of the illustrative circuit.

For convenience in locating the elements of the circuitry, and as an aid in recognizing the function of these elements, they have been given a two-part designation. In this designation, the numerical prefix represents the figure in which the element appears and the alphabetical suffix is generally an acronym descriptive of the function performed by the particular circuit element. For example, element 7-SPC is a flip-flop in FIGURE 7 which is set to $\underline{S}$tart the $\underline{P}$hase $\underline{C}$ounter. The lead designations and other elements also bear numerical prefixes indicative of the figure in which they originate; however, numerical suffixes are used to differentiate between the various elements in each figure.

As a further aid in recognizing the leads over which important control signals are applied, functional lead descriptions are used in addition to the numerical description. These functional descriptions are associated with the appropriate leads by means of small arrows; for example, lead 7–27 in the lower left portion of FIGURE 7 is designated $\overline{\text{Command Larger}}$. This indicates that the command larger signal is applied via this lead. Also, when the bar is placed above this type of functional lead description it indicates that the operative signal is a logic 0. The absence of such a bar indicates that the operative signal is a logic 1.

An additional factor of circuit symbology will be apparent in FIGURE 7. The small circles appearing on particular input leads, of decade 7–10 for example, indicate that the operative signals applied to these leads must be of the logic 0 state. In the absence of such circles, it is to be understood that the operative signal is of a logic 1 state.

The convention adopted herein is that a logic value "0" applied on a lead means that a positive voltage is applied. The logic value "1" on the other hand, is represented by a zero or negative voltage. This notation is consistent with the practice followed in the authoritative text on logic switching and design by Keister, Richie, and Washburn, entitled "The Design of Switching Circuits," D. Van Nostrand and Co., 1951.

The timing diagrams used in connection with circuit description are illustrated in accordance with the described convention. Thus, the base level, which corresponds to a zero voltage, represents a logic 1; and the raised level, which corresponds to a positive voltage, represents a logic 0. Furthermore, where the state of a flip-flop is represented by a waveform, the signal on the set output is illustrated. When "set," the set output has a logic 1 thereat and when "reset," the set output has a logic 0 thereat; accordingly, the waveforms shows the "set" condition as the lower level and the "reset" condition as the raised level.

In order to succinctly set forth the various circuit schematics, conventional symbols have been used to represent various logic and circuit functions. The symbols employed most frequently are illustrated in FIGURES 3A–3H. Any number of specific circuit configurations may be developed by those skilled in the art to perform the functions designated by the various circuit symbols. The voltages supplied to operate the circuits are, of course, dependent upon the specific components employed.

All digital logic circuits require devices to perform logic functions on the one hand, and storage or memory functions on the other. The logic functions in this system are performed by NOR packages as represented in FIGURES 3A through 3C. The memory or storage functions are performed by the bistable multivibrators or flip-flops represented in FIGURES 3D and 3G.

As is well known in the art, NOR logic exclusively may be used to synthesize any Boolean equation. The NOR operation is symbolically illustrated in FIGURE 3A wherein inputs A and B and output C are shown. Simply, this logic function can be defined as follows: if the A input, or the B input, or both, have a logic value 1 applied thereto, then the output C exhibits the logic value 0. Stating it another way, the output C is equal to logic 1 if neither input A nor input B is equal to logic 1. The truth table in FIGURE 3B illustrates the outputs available for all permutations of inputs.

FIGURE 3C is a single input NOR package. This is an inverter, but the notation utilized is the same as that for FIGURE 3A. The output B of the inverter always takes the opposite logic value from that of the input A.

There are many different circuits for developing the logic components represented in FIGURES 3A and 3C. However, particularly useful transistor NOR circuits for use herein are disclosed in a standard text on transistorized digital logic components entitled "Design of Transistorized Circuits for Digital Computers," by Abraham I. Pressman, John F. Rider, Publisher, Inc., New York, 1959. More particularly, a preferred two input transistor NOR circuit is shown in Figure 8–1, at page 8–191. The inverter of FIGURE 3C may be developed by having solely one input to the NOR circuit of Figure 8–1 of the Pressman text.

It is often the case that the NOR circuit must handle more than two input variables. This is easily accomplished since two or more NOR circuits may be placed in parallel to provide the required function. Thus, in Figure 8–16, at page 8–212 of the Pressman text, there may be found two NOR circuits in parallel to provide a logic 0 output if any of the four input leads has a logic 1 applied thereto. The parallel array may be increased considerably so that a large number of inputs may be arranged to perform this logic function. The over-all system operation is not affected adversely by this paralleling of the circuits since each of the NOR circuits has a transistor amplifier therein, whereby appropriate potential and current values are readily maintained.

A typical bistable multivibrator or flip-flop, used primarily for storage or memory, is shown symbolically in FIGURE 3D. This flip-flop may be developed in accordance with the circuit in the Pressman test shown in Figure 11–7, at page 11–296, by opening each of the two loops connecting each of the output leads with its input steering lead. Electronic set and reset inputs may be developed (to perform the logic functions to be described in the truth table of FIGURE 3F) by applying two input signals to the bases of the two transistors of the flip-flop, respectively, through a series resistor connected to each base terminal.

The logic of the flip-flop shown in FIGURE 3D is represented in the truth table of FIGURE 3E. In the device of FIGURE 3D, it may be noted that the input to the set and reset trigger leads C and D are tied together such that C always equals D. In ordinary use in the following circuits, a clock or counting pulse train is applied to this $C=D$ input. The clock pulse train is steered out of the flip-flop through either the G or H output leads, dependent upon the state of the set steering lead A and the reset steering lead B. In the truth table of FIGURE 3E, the output states for the leads G and H are represented both before and after the clock pulses are applied to C and D. Thus, the representation $G_N$ indicates the state of the output lead G prior to the application of the clock pulse, while the representation $G_{N+1}$ indicates the state of the output lead G immediately after the application of the clock pulse. The notations for output lead H are similar. It may be seen that an output lead changes its state upon the application of a clock pulse if the output lead state prior to the application of the clock pulse is the same as the logic value applied to the steering lead on each side of the flip-flop. These values can be seen in the portion of the truth table enclosed by a heavy black line.

The flip-flop of FIGURE 3D has two additional inputs, the electronic set lead E and the electronic reset lead F. These two inputs completely swamp the flip-flop and override any condition that exists at that time. The truth table of FIGURE 3F demonstrates the logic operation with the inputs E and F as the entering arguments. It may be noted that irrespective of any condition in the FIGURE 3E truth table, the application of a logic 1 to the E lead will produce a logic 1 at the G output, and the application of a logic 1 input to the F lead will produce a logic 1 at the H output.

The flip-flop of FIGURE 3D need not have its input leads C and D tied to each other. The truth table which completely describes this logic is presented in FIGURE 3H. The term "pulse present" as used in the truth table, means that the logic state on that lead has switched from logic 1 to logic 0. If there has been no change in state, or the change has been from logic 1 to logic 0, then there is a "pulse absent."

The flip-flop of FIGURE 3D is very readily utilized as a binary counting stage of an over-all pulse counter. FIGURE 3G shows the flip-flop arranged in a manner to perform this function. In this arrangement, the output lead G is fed back as the input lead A and the output lead H is fed back as the input lead B. This feedback constrains the flip-flop to act as a counter such that every time a pulse appears on the tied input lead $C=D$, the outputs G and H of the flip-flops change their state. This may be seen very readily by referring to the truth table of FIGURE 3E. The flip-flop of FIGURE 3G is a special instance of the truth tables of FIGURES 3E and 3H in that A and $G_N$ must always be the same, and B and $H_N$ must always be the same. Under these circumstances, whenever a zero going pulse input, i.e. a change in state from logic 1 to logic 0, is applied to the $C=D$ lead, the output states G and H switch. The mechanization of such circuitry is shown in detail in the above mentioned Pressman reference in Figure 11–7 at page 77–296.

Throughout the following circuit descriptions the flip-flop terminals are referred to in the terms just described. This is true even where illustrative clarity was obtained by omitting the specific alphabetical labeling of each terminal.

*Position Command Signal Generation (FIGURE 4)*

It should now be clear that a number of the functioning blocks of the system as shown in FIGURE 2 may be fabricated by well known equipment and circuitry. The cooperative relationship between each block is also believed to be understood. The following descriptive matter is required to provide a sufficiently detailed explanation of particular circuits to insure that those familiar with the art of machine tool positioning will fully appreciate and be able to practice the invention. Generally speaking, the figures which will now be discussed comprise logic schematic drawings of circuits specifically adapted to accomplish particular functions that are important to the proper functioning of the system.

It is important to understand the operation of the Command Phase Counters in order to appreciate the operation and functioning of the entire system.

In FIGURE 4 a plurality of Command Phase Counters 4–33, 4–34, 4–35 for generating the phase coded command signal are illustrated. A Reference Pulse Rate Divider 4–32 and a Pulse Generator 4–10 are also shown in this figure and in toto, the composite block schematic represents the means for generating phase coded command signals and the necessary reference signals that are used by the system of the present invention.

Considering first the Pulse Rate Divider 4–32 which appears across the upper portion of FIGURE 4, it will be seen to comprise three decades 4–11, 4–12, and 4–13. Each decade comprises four individual stages interconnected to form a binary-coded-decimal counter wherein the respective stages are weighted 1-2-4-5. Such counters are well known in the art and may be fabricated using the flip-flops described hereinbefore in connection with FIGURE 3G. The successive decades are interconnected by carry leads 4–29, 4–30 and consequently, the three illustrated decades are capable of counting to a maximum of 1000. The input pulses to the least significant decade 4–11 of the Pulse Rate Divider are generated by 250 kilocycle per second Pulse Generator 4–10 appearing in the upper lefthand corner of the figure. If the output of each individual decade is considered, it will be seen, therefore, that the output pulse train from the last stage of decade 4–11 will have a pulse repetition rate of 25 kilocycles per second; the output of the last stage of decade 4–12 will have a pulse repetition rate of 2.5 kilocycles per second; and the output of the last stage of decade 4–13 will have a repetition rate of 250 cycles per second.

Since a decimal form of counting is used, and since each permutation of states represents a decimal number in accordance with a particular binary code weighting, the individual stages can be assigned a decimal weighting in accordance with the coding and the particular decade involved. Thus, considering the decades from left to right, i.e. from 4–11 through 4–13, they represent decimal numbers in units, tens, and hundreds, respectively. Furthermore, the individual stages are assigned the decimal values equivalent to their binary code weighting multiplied by the particular power of 10 represented by the decade in which they reside. For example, in tens decade 4–12, the stages are designated 10–20–40–50 respectively (the 1-2-4-5 weighting individually multiplied by $10^1$).

The outputs from not only each decade, but also from the individual stages within each decade are used throughout the system to be described hereinafter. In order to conveniently represent particular signals that are extracted from the Reference Pulse Rate Divider, a lead designating technique has been employed similar to that already mentioned in the Circuit Symbology section. This lead designation technique identifies the output of the individual stages in accordance with the decimal weighting thereof. Thus, the G output (a logic 1 when the stage is set) of the "10" stage of decade 4–12 is designated R10, and the H output (a logic 0 when the stage is set) of this stage is designated $\overline{R10}$. The "R" is used as a prefix in each designation to distinguish from the signals extracted from the Command Phase Counters.

Turning to a consideration of Command Phase Counters 4–33, 4–34, and 4–35, it will be seen that they each comprise three decades of binary-coded-decimal counters. Each decade has a distinct decimal weighting and each stage in the decade may be considered to have a specific decimal value. Thus, decade 4–14 comprises four stages having the decimal values 0.1, 0.2, 0.4, and 0.8. The particular decimal values assigned depend upon the equipment range and the resolution required. In this embodiment, a range of 100 inches with a resolution of 0.0001 of an inch has been assumed. In accommodating these figures to a multiple range command system, as illustrated, the maximum range of each Command Phase Counter has been established as 100 inches, 2 inches, and 0.1 of an inch for the coarse, medium and fine counters respectively.

At the commencement of each operation, each stage is preset in accordance with the input data under the direction of input equipment such as described in conjunction with FIGURE 2. Thereafter, $\overline{\text{clock}}$ pulses are applied over lead 4–31 to the least significant decade of each Command Phase Counter 4–33, 4–34, 4–35 and also to the least significant decade of Reference Pulse Rate Divider 4–32. Because each circuit is a counter, each $\overline{\text{clock}}$ pulse increases the number registered therein by one decimal digit. When a full count of 1000 is registered in any counter the last stage in its most significant decade is reset to provide a logic 0 at its G output. These outputs are designated by leads 4–25, 4–26, 4–27 and 4–28. The time of occurrence, or phase relationship, between the logic 0 signals from the Command Phase Counters with respect to the time of occurrence of a logic 0 output from the Reference Counter is determined by the number preset into each Command Phase Counter and represents the commanded position within each range.

For example, to command a position of exactly 25 inches from a prescribed reference point, Coarse Command Phase Counter 4–33 is preset with the decimal number 250 and each of Command Phase Counters 4–34 and 4–35 is preset with 000. Counting is then initiated, and after 750 $\overline{\text{clock}}$ pulses Coarse Command Phase Counter 4–33 supplies a logic 0 on output 4–25. After 1000 $\overline{\text{clock}}$ pulses, Reference Pulse Rate Divider 4–32 and Command Phase Counters 4–34 and 4–35 supply logic 0 outputs on leads 4–28, 4–26, and 4–27 respectively. The time interval between occurrence of logic 0 from the output of Coarse Command Phase Counter 4–33 and Reference Pulse Rate Divider 4–32, i.e. the time required to count 250 pulses, discretely represents the desired command position of 25 inches. The coincidence of occurrence between the outputs of the other Command Phase Counters 4–34 and 4–35 and Pulse Rate Divider 4–32 indicates that exactly 25 inches is commanded rather than a position differing therefrom by even as little as 0.0001 of an inch.

In a number of circuits described hereinafter, outputs from the individual stages of the Command Phase Counters are employed. In order to avoid confusion by a multiplicity of interconnecting lines, the outputs have been given designations similar to those described in connection with Pulse Rate Divider 4–32. Thus, for example, the outputs of the 0.1 stage in decade 4–14 are designated 0.1 and $\overline{0.1}$; the former designation representing the G output, and the latter designation representing the H output.

*Positioning Velocity Control Circuit (FIGURES 5, 5A)*

The manner in which the multi-range phase modulated position command signals are generated has been discussed in the preceding section. The generation of the velocity command signals will now be considered. A number of distinctive circuits are involved in developing the velocity command because not only phase displacement is involved, but also, frequency change. As already explained in conjunction with FIGURE 2, the Positioning Velocity Control Circuit functions to select a pulse frequency commensurate with a desired velocity or machine feed rate. This selected pulse frequency is then used to supply a special Feed Command Phase Counter which produces a 250 cycle per second output that varies in phase at a rate proportional to the selected frequency.

A Positioning Velocity Control Circuit for use in an illustrative embodiment of the invention is shown in FIGURE 5. The components which make up the functioning circuit include a Multiplier Counter, a plurality of Multiplier Gates, and a Buffer Storage unit for storing the input data command. Assuming a desire to modify an incoming pulse rate by a factor as great as 1000, the circuitry is provided with what amounts to three decades of counting capacity. The individual decades are substantially identical and consequently, one only is illustrated in detail. Thus, the first decade of the Multiplier Counter is shown at 5–10 enclosed by dashed lines. The corresponding decade of the Buffer Storage units is similarly shown at 5–13 and the first decade of the Multiplier Gates which coordinate the outputs of the Multiplier Counter decade 5–10 and Buffer Storage decade 5–13 is shown at 5–16.

The Multiplier Counter decade 5–10 comprises flip-flops 5–11, 5–12, 5–14, and 5–15 interconnected to count pulses on lead 5–17 in accordance with a binary-coded-decimal weighting 1–2–4–5, respectively. This counting is modified by a gating input applied on lead 5–20 as will be explained hereinafter. The numerous interconnections between each flip-flop are shown in detail in the figure and inasmuch as the functioning of the flip-flops and NOR gates used in this circuit has been fully described in conjunction with FIGURES 3A–3H, a verbal tracing of these interconnections with circuit operations is not believed necessary. Specific attention is directed, however, to NOR 5–27 appearing in the lower right corner of the decade 5–10, which has its inputs connected to the H outputs of the last two stages 5–14, 5–15 therein. This NOR gate is operative to produce a discrete logic 1 output each time the Multiplier Counter decade 5–10 registers a 9. Thereafter on a count of 10, the resetting of the decade generates a pulse, i.e. a transition from logic 1 to logic 0 which appears on lead 5–47.

Counter operation in response to particular pulse inputs can be conveniently explained in connection with an examination of FIGURE 5A wherein the various states of the individual elements of the Positioning Velocity Control Circuit are set forth in a timing diagram. The waveforms presented in the timing diagram have all been designated with the same basic numerical designations as the elements whose operation they represent. The designations do differ, however, in that the prefixes indicate FIGURE 5A rather than 5. Thus, the counting pulses on lead 5–17 are illustrated by the upper waveform 5A–17 and the gating impulses on lead 5–20 are illustrated by the second waveform 5A–20.

Consider a normal cycle of operation. Assume flip-flops 5–11, 5–12, 5–14, and 5–15 initially reside in a 0 state. A change of state in the counter occurs when a counting pulse appears on a flip-flop which has its steering lead A or B appropriately energized with a logic level that corresponds to that of its associated output G or H. This occurs, as will be seen in the timing diagrams, upon appearance of the second counting pulse. At this time, a logic 0 counting pulse is applied to the C and D inputs of flip-flop 5–11. Since the G output of flip-flops 5–11 and 5–14 have been assumed to be logic 0 and the gate input 5A–20 on lead 5–20 is positive (i.e. logic 0) a unique logic 1 is produced at the output of NOR 5–19. The logic 1 is inverted by inverter 5–18 and applied as a logic 0 to the set steering input A of flip-flop 5–11. Consequently, in response to the second counting pulse, flip-flop 5–11 switches to a set state as shown in waveform 5A–11. No other flip-flops change state because no further appropriate triggering and steering signals are applied to the counter.

Upon application of the fourth counting pulse, flip-flop 5–11 is once again switched and this time the voltage transition appearing at its G output, as it switches from logic 1 to logic 0, is effective to apply a triggering pulse to the second flip-flop 5–12. Due to the interconnection between the G output and the set steering input A of flip-flop 5–12, the occurrence of this triggering impulse is effective to switch it to a 1 state as shown in waveform 5A–12.

In a similar manner, subsequently occurring counting input pulses and gate input pulses are effective to control the switching of the respective flip-flops of the Multiplier Counter 5–10 as represented by their waveforms in the timing diagram. The cycle continues until coincidence of the trailing edge of the tenth input gate pulse and the leading edge of the twentieth counting pulse is effective to reset flip-flops 5–14 and 5–15 to their 0 states. At this time, all flip-flops are once again in their 0 state. In a circuit such as shown herein, the reset of decade such as 5–10 results in delivery of a logic 0 carry pulse on lead 5–29 to the subsequent decade 5–30 which, in response thereto, registers a count of 1. This carry signal is illustrated by waveform 5A–29 in FIGURE 5A.

Thus far what has been described is a typical 1–2–4–5 binary-coded decimal counter operative in response to counting pulses and gating pulses. The Positioning Velocity Control Circuit is designed to provide a pulse output train which has a relatively constant repetition rate that is a selectable fraction of the repetition rate of the input pulse train on the gating lead 5–20. The generation of such an output pulse train on output summation line 5–44 takes place in the Multiplier Gates which gate appropriate signals from the Multiplier Counter in accordance with the commands of the data stored in the Buffer Storage unit.

The Buffer Storage unit is made up of three decades 5–13, 5–33, 5–43, each of which contain four bistable stages 5–21, 5–22, 5–24, and 5–28 which may be set in accordance with binary coded input data weighted 1–2–4–8. Outputs corresponding to the H output only of flip-flops which may serve as these bistable elements have been shown. The means of setting information into the Buffer Storage units are not germane to the invention and any technique of the many known in the art may be employed. The H outputs have been illustrated for purposes of providing inputs to the Multiplier Gates 5–16, 5–36, and 5–46.

The Multiplier Gates of the first decade 5–16 comprise a plurality of NOR gates 5–31, 5–32, 5–34, 5–38, and 5–35. With the exception of the latter gate, these gates are selectively supplied by the gating signal on lead 5–20; particular G outputs of the flip-flops in Multiplier Counter 5–10; and the H output of a corresponding bistable element of Buffer Storage unit 5–13. The selection is made in accordance with the requirements of developing a relatively constant repetition rate output pulse train. The outputs of NOR gates 5–31, 5–32, 5–34, and 5–38 are applied as inputs to NOR 5–35 and accordingly, NOR 5–35 provides a unique logic 1 output only when all outputs from the aforedescribed group of input gates are presenting a logic 0.

In a Velocity Control Circuit such as shown herein, wherein three decades are employed, it should be appreciated that the decades of the Multiplier Counter are associated with Multiplier Gates which are controlled by Buffer Storage units in decades having the reverse decimal weighting. In other words, the outputs of the flip-flops comprising the most significant decade 5–13 of the Buffer Storage are combined with the outputs of the flip-flops comprising the least significant decade 5–10 of the Multiplier Counter at the inputs of Multiplier Gates 5–16; correspondingly, the outputs of the flip-flops of the least significant decade 5–43 of the Buffer Storage are combined with the outputs of the flip-flops of the most significant decade 5–40 of the Multiplier Counter at the inputs of Multiplier Gates 5–46.

By considering the storage of the numerical command "6" (a permutation of states 0–1–1–0) in the Buffer Storage unit, an understanding may be obtained of the cooperative operation of Multiplier Counter decade 5–10 and Buffer Storage decade 5–13 via Multiplier Gates 5–16. In such a situation, the outputs on leads 5–39 and 5–41 are logic 0 and the outputs on leads 5–37 and 5–42 are logic 1. Accordingly, there is a pulse output, i.e. transition from logic 1 to logic 0, on the output summation line 5–44 in the following alternative coincidence of conditions: either (1) flip-flop 5–11 is in its 1 state, flip-flop 5–12 is in its 0 state, and the gate pulse occurs on line 5–20 whereby a logic 1 appears on the output of NOR 5–32; or (2) flip-flops 5–11 and 5–14 are both in their 0 states and the gate pulse occurs whereby a logic 1 appears on the output of NOR 5–34. If either of these conditions occur, there is a pulse output on output summation line 5–44. A numerical command "6" in the Buffer Storage signifies that for every 10 input gate signals there will appear six pulses on output summation line 5–44. Waveforms 5A–50 through 5A–59 in FIGURE 5A show the respective waveforms appearing on output summation line 5–44 for numerical commands "0" through "9" respectively. It is seen that these waveforms are based on voltage levels. Waveforms 5A–21, 5A–22, 5A–24, and 5A–28 show the waveforms appearing on the output summation line 5–44 as a function of the 1 states of the individual respective flip-flops 5–21, 5–22, 5–24, and 5–28 in the Buffer Storage circuit 5–13. These waveforms are also based upon voltage levels. Inspection of the waveforms 5A–21, 5A–22, 5A–24, and 5A–28 shows that the waveforms of lines 5A–50 through 5A–59 are actually different combinations thereof. Thus, the waveform for the numerical command "6" as shown at 5A–56 is the combination of the waveforms 5A–22 and 5A–24.

Waveform 5A–60 indicates the pulse output appearing on the output summation line from the least significant decade. For example, let it be assumed that a three decade Positioning Velocity Control Circuit is utilized wherein the Pulse Rate Multiplier portion on the left of FIGURE 5 is the least significant decade of the counter, i.e. the units decade, and that Buffer Storage decade 5–13 is the most significant decade thereof, i.e. the hundreds decade. Let it be further assumed that the numerical command number is "245" whereby it is intended that 245 pulses appear on the output summation line 5–44 for every 1000 input gate pulses applied on line 5–20. In this situation, with regard to the units decade 5–10 of the Multiplier Counter, a pulse will appear on the output summation line at every second and seventh input gate signal as shown in waveform 5A–52. With regard to the tens decade 5–30 of the Multiplier Counter, a pulse will appear on the output summation line 5–44 when that decade setting is 10, 30, 60, and 80 which is, of course, in accordance with the waveform 5A–54. With regard to the hundreds decade 5–40 of the Multiplier Counter, a pulse appears on the output summation line when the setting therein is 100, 300, 500, 600, and 800 which is, of course, in accordance with the waveform 5A–55.

An inspection of waveforms 5A–50 through 5A–59 of FIGURE 5A, i.e. the numerical command waveforms, reveals that the pulses therein are relatively symmetrically displaced with respect to each other. This results from the utilization of a binary-coded-decimal counter and a binary-coded buffer storage command in the Velocity Control wherein the weightings of the respective flip-flops in the Multiplier Counter are different from the weightings of the flip-flops in the Buffer Storage.

Manual Feedrate Override (FIGURES 6, 6A)

Having obtained an understanding of how the velocity command data is used to develop a pulse train having a repetition rate commensurate with the velocity with which the apparatus is to assume its new position, the Manual Feedrate Override Circuit may now be considered. This circuit provides the means for manually changing the instructions presented by the input data in accordance with the desire of an operator. In essence, this function is accomplished by manually controlling the pulse repetition rate of the signal that is applied as a gating signal to the Velocity Control Circuit described in the preceding section.

The circuit in FIGURE 6 presents an arrangement suitable for use as the Manual Feedrate Override Circuit. In this arrangement, the output of a Pulse Rate Divider such as shown at 2–21 in FIGURE 2 is applied as counting pulses to the least significant flip-flop, 6–51, of a scale-of-16 binary counter comprising flip-flops 6–51, 6–52, 6–54, and 6–58. In response to each counting pulse, the counter increases the number registered therein in accordance with a 1–2–4–8 binary code.

The counter in FIGURE 6 is restricted to 15 stable permutations of state by means of NOR 6–53 which has the G output of each stage applied as inputs thereto. The output of NOR 6–53 is connected to the electronic set input E of flip-flop 6–51. Accordingly, when the sixteenth counting pulse of each cycle is applied via lead 6–10 and all of the flip-flops of the counter are reset to their 0 states, the inputs to gate 6–53 all coincidently become logic 0 and a logic 1 is applied to electronic set input E of flip-flop 6–51, causing it to switch to a 1 state.

As is shown hereinafter, since the Manual Feedrate Override Switch can conveniently be constructed to provide 150% of a chosen 100% system operating velocity, a 15 count cycling of the counter in FIGURE 6 provides a convenient numerical relationship with such percentages.

The Feedrate Override Switch 6–59 of the Manual Feedrate Override circuitry comprises a series of four mechanically connected contact arms 6–11 which are adapted to selectively make contact with contacts arranged in rows, the rows indicating a percentage of the velocity. It is seen that there are sixteen rows, each row representing a multiple of 10% and thus, the rows range from 0% to 150%. The 100% row can be chosen to be the normal desired rate of operation and thus, the Manual Feedrate Override can be set with the contact arms on the 100% row for regular input velocity controlled operation.

Obviously, if the contacts are moved to the 100% row, then a positive voltage, i.e. a logic 0 appears on leads 6–60 and 6–61. These leads are inputs to NOR gates 6–70 and 6–72 respectively. The contacts for establishing the logic 0 conditions on leads 6–60 and 6–61 are on columns 2 and 8 of the override switch. Since there are no contacts in columns 1 and 4 at the 100% row, there is a zero voltage, or logic 1, applied to lead 6–62 and 6–63.

When the contact arms are at the 100% row, if flip-flops 6–51 and 6–52 are in their 0 states, and flip-flop 6–54 is in its 1 state, the output of gate 6–70 is a logic 1 whereby the output of NOR gate 6–74 is a logic 0. Similarly, if the contact arms are at the 100% row, if flip-flop 6–51 is in its 1 state, the output of NOR gate 6–72 is a logic 1 whereby the output of NOR 6–74 is a logic 0. This may be readily understood if columns 1, 2, 4 and 8 of the override switch are considered to correspond to a straight four stage scale-of-16 binary counter wherein column 1 has the weight of 1, column 2 has the weight of 2, column 4 has the weight of 4, and column 8 has the weight of 8. Using this terminology, when the contact arms are placed at the 100% row, effectively, a storage of 10 is provided. Since 10 is two-thirds of 15, the amount of pulses in each cycle, when the contact arms are placed at the 100% row ten pulses will appear at the output gate 6–74 for each fifteen counting pulses applied to lead 6–10.

In FIGURE 6A, waveform 6A–10 represents the counting pulse input on lead 6–10 of FIGURE 6. Waveforms 6A–51, 6A–52, 6A–54, and 6A–58 show the logic signals produced at the G outputs of flip-flops 6–51, 6–52, 6–54 and 6–58 respectively, during a cycle of 15 counting pulses. Further, waveform 6A–80 shows the output of NOR 6–74 when the contact arms of switch 6–59 are at the 80% row; waveform 6A–40 shows the output of NOR 6–74 when the contact arms are at the 40% row; waveform 6A–20 shows the output of NOR 6–74 when the contact arms are at the 20% row; and waveform 6A–11 shows the output of NOR 6–74 when the contacts are at the 10% row. In this latter connection, it is noted in switch 6–59 that at the 10% row, a contact only appears at column 1; at the 20% row, a contact only appears at column 2; in the 40% row a contact only appears at column 4; and in the 80% row, a contact only appears at column 8. Thus, waveforms 6A–80, 6A–40, 6A–20 and 6A–11 show the respective outputs of NOR 6–74 which are produced when only a single column is gated together with the outputs of the counter comprising flip-flops 6–51, 6–52, 6–54 and 6–58. Any percentage figure other than 10, 20, 40 or 80%, respectively, is provided by the corresponding combinations of the waveforms 6A–11, 6A–20, 6A–40, and 6A–80.

It has been shown above that when the contact arms of Feedrate Override Switch 6–59 are at the 100% row, actually the pulse train that is gated out by NOR 6–74 for a given interval contains only two-thirds the number of counting pulses applied via lead 6–10 for such given intervals. In ordinary operation of the system of this invention, the frequency of the pulses appearing at the output of NOR 6–74 when the contact arms of switch 6–59 are at the 100% row, is chosen to be such that the following circuitry effects operation of the feed mechanism to yield the desired velocity.

It is recalled that in the Velocity Control Circuit of FIGURE 5, the numerical command frequency, i.e. the frequency appearing at the output summation line 5–44, is a fraction of the input gate signal. For example, a numerical command, 600, signifies that for every 1000 input gate pulses to the Velocity Control Circuit, i.e. every 1000 pulses appearing at the output of NOR 6–74 in the Manual Feedrate Override, 600 pulses appear on the output summation line 5–44 of the Velocity Control Circuit. Thus, the numerical command is a ratio, viz., the ratio of the number of pulses for a given interval on the output summation line 5–44 of the Velocity Control Circuit to the number of pulses at the output of NOR 6–74. Since this is such a ratio, increasing or decreasing the pulse repetition frequency at the output of NOR 6–74 corresponding increases or decreases the output on the summation line 5–44 in accordance with the chosen ratio. Thus, Manual Feedrate Override Switch 6–59 permits increasing of the frequency of the input gate signal on lead 5–20 to the Velocity Control Circuit from the chosen 100% rate by a factor of one and one-half and permits decreasing the rate down to zero. This is readily appreciated when it is seen that if the contact arms are placed, for example, at the 150% row, then for each complete cycle of the counter comprising flip-flops 6–51, 6–52, 6–54, and 6–58, fifteen pulses appear at the output of NOR 6–74. Similarly, the selection of any row other than the 100% row, increases or decreases the output frequency of NOR 6–74 in multiples of 10% from the 100% output frequency.

Of course, when the contact arms are at the 0% row, a logic 0 cannot appear at the output of NOR 6–74 and there is no output from the Manual Feedrate Override Circuit. Under these conditions, there is no output from the Velocity Control Circuit either. Because of this, the Feed Command Phase Counter (to be discussed in the next section) does not receive velocity command pulses. Thus, by selecting a 0% Manual Feedrate, the entire control system can be halted and thereafter can be restarted by resetting switch 6–59 at any row other than the 0% row.

*Feed Command Phase Counter (FIGURES 7, 7A, 7B, 7C)*

FIGURE 7 illustrates a circuit which will provide the features of the Feed Command Phase Counter 2–16 shown in FIGURE 2. As previously mentioned, the Feed Command Phase Counter is used to produce a substantially 250 cycle per second signal which varies in phase at a rate commensurate with the machine velocity as dictated by the input data. It will be recalled that the data input is translated by the Positioning Velocity Control Circuit (FIGURE 5) to a pulse train of selected frequency and that this in turn is possibly modified by the action of the Manual Feedrate Override Circuit (FIGURE 6).

The Feed Command Phase Counter comprises three decades of binary-coded-decimal counters, 7–10, 7–11 and 7–12. All three decades are count-up counters, but counter 7–10, which is the first decade of the three, is a variable rate counter in a special sense. The 250 kilocycle per second $\overline{\text{clock}}$ pulse train is applied as an input to the variable rate counter 7–10 at lead 7–14. As long as input data indicates that no velocity control is to be exerted, the variable rate decade 7–10 operates as a normal counter and the entire Feed Command Phase Counter functions to divide the incoming reference pulse rate by 1000 and produces a 250 cycle per second output on lead 7–21.

In order to synchronize operation with the rest of the system, the 250 cycle per second square wave output from the Feed Command Phase Counter is initially made to be in phase with the fine position feedback signal by initially resetting all flip-flops thereof and then starting the counter in synchronism with the fine position feedback signal. The mechanism for accomplishing this synchronization includes Start Phase Counter flip-flop 7–SPC which is operative to produce a resetting logic 1 signal on lead 7–17 when the fine position feedback signal occurs on lead 7–18 during the presence of a $\overline{\text{Feed Allowed}}$ signal on lead 7–19 (indicating velocity controlled operation). The G output of Start Phase Counter flip-flop 7–SPC is connected via an inverter 7–20 to each of the reset inputs of decades 7–10, 7–11, and 7–12 to accomplish the desired operation. Accordingly, at the start of an operation the Feed Command Phase Counter advances through its sequence of 1000 counts in synchronism with the fine position feedback signal, advancing one count for each input $\overline{\text{clock}}$ pulse on lead 7–14. Each series of 1000 counts produces one cycle of the feed command signal output on lead 7–21, and this output is fixed in phase with respect to the feedback signal developed at the output of the fine position feedback resolver.

When a specific velocity is commanded by the input data, the phase of the feed command signal is shifted by modifying the normal counting action of the first decade 7–10 of the Feed Command Phase Counter. Since there are two possible directions of feeding and phase shifting, two types of modified counting action must be available from the first decade 7–10. One type of modified counting action consists of advancing the counter two counts for every one input $\overline{\text{clock}}$ pulse. Each time this happens, the counter has gained one count (the number in it is greater by one) and all subsequent events in it occur sooner because of the gain. The other type of modified counting action consists of not advancing the counter at all for one input $\overline{\text{clock}}$ pulse. Each time this happens, the counter has lost one count and all subsequent events in it occur later because of the loss. Modified counting action is put into effect by the action of control voltages applied to the special gating circuits in the first decade. The choice of the type of modified counting to be used (in the event that modification should be made) is determined by whether or not the commanded position is larger than the actual position. This is indicated by the presence or absence of a $\overline{\text{Command Larger}}$ signal on lead 7–27 from the Command Larger Detector illustrated in FIGURE 8 and discussed hereinafter. Whether or not modified counting is to be used rather than regular counting, is controlled by whether or not a control velocity is presented by the input data equipment. This is indicated by the presence of a pulse train input from the Velocity Control Circuit (FIGURE 5) on lead 7–23.

A single feed rate pulse from the Velocity Control Circuit on lead 7–23 causes the Feed Command Phase Counter either to gain or to lose one count and thus causes the feed command signal on lead 7–21 to be advanced or retarded in phase by $\frac{1}{1000}$ of a cycle. In accordance with the previous assumptions, such an amount of phase shift commands a machine axis movement of 0.0001 of an inch. A uniform stream of pulses from the Velocity Control Circuit on lead 7-23 results in a repeated gain or loss of counts and a continuously changing phase of the command signal delivered by the Feed Command Phase Counter. This, in turn, causes a constant velocity operation of the apparatus. During such operation, each cycle of the feed command signal is actually shorter or longer than one cycle of the reference voltage from the Reference Pulse Rate Divider (FIGURE 4), and the frequency is, therefore, higher or lower than the nominal value of 250 cycles per second.

The counting action of the Feed Command Phase Counter is controlled by voltages applied to the two input terminals 7-13 and 7-15, respectively labeled "Normal Count" and "Double Count." The counter counts normally when the Normal Count input has a logic 0 thereon and the Double Count input has a logic 1 thereon. This condition occurs when the command is in fact smaller than the actual position of the equipment and a feed pulse is delivered by the Velocity Control Circuit previously described. If the Normal Count input 7-13 is negative while the Double Count input 7-15 is negative, i.e. if both inputs have a logic 1 thereon, the clock pulses on lead 7-14 are ineffective and the counter does not advance its count. Finally, when the Double Count input alone has a logic 0 thereon, circuits within the counter decade 7-10 redirect the clock impulses to the second flip-flop thereof and the counter advances two counts for each individual input clock pulse applied on lead 7-14. This latter condition occurs when the command is larger than the position and a pulse is delivered from the Velocity Control Circuit.

The feed rate signal from the Velocity Control Circuit of FIGURE 5 is delivered to both the Normal Count and Double Count inputs via a plurality of logic gates appearing on the left side of the figure. The Command Larger signal is also introduced via these logic gates. As shown, a two input NOR gate 7-24 has as inputs thereto an R1 synchronizing signal from the Reference Pulse Rate Divider (FIGURE 4) and the output of the Velocity Control Circuit. The output of this NOR circuit is coupled to the Normal Count input 7-13 via series connected NOR 7-25 and inverter 7-26. The second input to NOR 7-25 is from the H output of Start Phase Counter flip-flop 7-SPC which presents a logic 0 when the Start Phase Counter flip-flop is set.

Leads 7-22 and 7-23 are also introduced to the Double Count input 7-15 via a NOR 7-28 and an inverter 7-29. Additional inputs to NOR 7-28 include the H output of Start Phase Counter flip-flop 7-SPC and the Command Larger signal on lead 7-27. It is thus apparent that when the Command Larger signal is presented to NOR 7-28 (indicating that the command is larger than the actual position), and Start Phase Counter flip-flop 7-SPC is set, the signals R1 and Velocity Control are effective to control the Double Count input 7-15.

The R1 synchronizing signal, which has a repetition rate of one-half the clock pulse rate, is used in order to create a normal count operation on each of the odd numbered clock pulses. When the Velocity Control signal is also a logic 1, representing no feeding increments, it will insure a normal counting operation on the even as well as the odd numbered clock pulses, i.e. full counting. When the Velocity Control signal is a logic 0, and therefore a feed increment signal is being presented, Normal Count operation will be blocked for either direction of feeding. In the latter case, simultaneously, Double Count operation is enabled for up-scale feeding when the Command Larger signal is at logic 0; double counting, of course, being implemented via NOR 7-27 and inverter 7-28.

A more detailed examination of the first decade 7-10 of the Feed Command Phase Counter is made available by the logic schematic shown in FIGURE 7A and the following ancillary FIGURES 7B and 7C.

FIGURE 7A is the logic circuit of a Feed Command Phase Counter that can be used to accomplish the functions described in connection with FIGURE 7. Each of the three decades 7A-10, 7A-11, and 7A-12 of FIGURE 7A, comprises four binary stages so as to represent a decade with a binary-coded-decimal weighting of 1-2-4-8. The first decade, 7A-10, shown on the left, is the units decade; the second, 7A-11, is the tens decade; and the third, 7A-12, is the hundreds decade.

As previously noted, the second and third decades 7A-11 and 7A-12 are identical to each other. The first decade, 7A-10, which is the input decade, includes the circuitry typical of a fixed rate count-up counter but additionally, includes special logic circuitry which permits it to count at a variable rate. To comprehend the manner in which the first decade functions as a variable rate counting decade, it is first necessary to understand the operation of such a binary-coded-decimal decade in a fixed rate mode of operation.

Consider the second decade. Each of its four stages, 7A-31, 7A-32, 7A-34, 7A-38, comprises a counter flip-flop stage such as shown in FIGURE 3G and described above. The permutations of the output states of the four stages for ten successive counting pulse inputs to the first stage 7A-31 are shown in FIGURE 7B.

In FIGURE 7B, the lefthand column represents the decimal numbers 0 through 9 that may be represented in the second decade by logic state permutations in binary-coded-decimal form. Counting from 0 through 9 is achieved by pulsing the input stage 7A-31 ten times, successively. The second through fifth columns of FIGURE 7B represent the states of the four counter stages of the decade for the decimal digits 0 through 9. Thus, each row of FIGURE 7B commences with a decimal number followed by a permutation of four logic states for the four binary stages which constitutes the binary-coded-decimal representation for that decimal number.

This representation is for the typical counting arrangement for a binary-coded-decimal count-up decade in fixed rate operation. Reference to the 1-unit stage (7A-31) column demonstrates that it changes state with each input pulse. Stage 7A-32 (the 2-unit stage) changes state on every second input pulse applied to stage 7A-31 except over end from 9 to 0. The 2-unit stage pulses the 4-unit stage (7A-34) to the 1 state on the fourth input to the 1-unit stage and to the 0 state on the eighth input pulse to the 1-unit stage. When the 4-unit stage switches to the 0 state, it pulses the 8-unit stage (7A-38) to the 1 state. On the tenth input pulse to the 1-unit stage, its change of state pulses the 8-unit stage so as to change the state thereof to 0, thereby producing an output pulse on the lead 7A-16 to the next decade. (In the case of the third decade, this output pulse appears on lead 7A-21.) Thus, this output from each decade occurs at the completion of every tenth count to the input stage. The 2-unit stage is precluded from changing state with the application of the tenth pulse to the 1-unit stage, by a blocking signal generated by the 8-unit stage when it switches to a 1 state for the decimal count of 8 and 9. All four stages are then in their 0 state and the decade represents the decimal digit zero.

This is the type of counting that is required for the first decade when fixed rate counting is to occur. The signals required for causing the decade 7A-10 to skip a count or double a count have already been considered with respect to FIGURE 7. In adapting the discussion of FIGURE 7 to FIGURE 7A, it should be noted that leads 7-13, 7-14, and 7-15 in the former figure correspond to leads 7A-13, 7A-14, and 7A-15 in the latter figure.

Recall that when the phase shift is to be in the positive direction, the counter should count not only the pulses of the clock train on lead 7A-14, but also the pulses applied to the counter from the positioning Velocity Control Circuit. This is accomplished by having the counter count two rather than one for every simultaneous occurrence of a pulse on lead 7A–14 and on lead 7A–15 at the input to the variable rate decade. To make the counter register two counts for each one input pulse, it is necessary to change the states of the counter stages by the equivalent of a count of two. This is accomplished when the counter is registering a count 0 to 7, inclusive, by changing the state of the 2-unit stage of the variable rate decade rather than changing the state of the input 1-unit stage.

Looking at the table of FIGURE 7B for the rows 0 through 7, it will be seen that changing the state of the 2-unit counter stage and leaving the 1-unit counter stage undisturbed does, in fact, change the permutations of the stages such that a count of 2 rather than a count of 1 is accomplished. In decimal digit 0 row, changing the 2-unit stage from logic 0 to logic 1 results in a permutation of states identical to the permutation of states for the decimal digit 2. Changing the same 2-unit stage from logic 0 to logic 1 in row 1 results in the identical permutation of states shown in row 3. Similar analysis will indicate the effect of changing the state of the 2-unit stage when rows 0 through 7 are involved.

When a count of 2 is to be added to a permutation of states representing decimal 8 or 9, the state of the 8-unit stage must be changed rather than the state of the 2-unit stage. That change in the state of the 8-unit stage will, in fact, do the job, may be readily seen. Decimal 8 plus 2 is equal to decimal 10; this means that the entire decade must go to decimal 0 (a 0 on each of the four stages of that decade) with an output or carry pulse over to the next decade. Decimal row 8 shows that the only stage that is in the 1 state is the 8-unit stage. Changing that stage to 0 results in all four stages being 0 and produces, of necessity, an output pulse to the next stage. Similarly, adding or counting 2 onto the permutation of decimal row 9, should produce the decimal 11 which is the same as the decimal 1 with a carryover to the next decade. It will be seen that changing the 8-unit stage of decimal row 9 from 1 to 0, results in a permutation exactly the same as that shown in decimal row 1 and, of necessity, produces an output pulse to the next decade from the 8-unit stage.

The specific logic circuitry required in the Variable Rate Counter for gating the 2-unit and 8-unit stages in accordance with the above description and also for blocking the application of counting pulses to the counter when a negative direction of phase shift is desired, is shown in detail with respect to decade 7A–10 in FIGURE 7A.

The first decade 7A–10 in FIGURE 7A will be seen to comprise the four bistable flip-flops 7A–1, 7A–2, 7A–4, and 7A–8 required to provide binary-coded-decimal counting. These stages are interconnected in order to provide such counting in accordance with the 1–2–4–8 binary code shown in FIGURE 7B. In addition, special gating circuits are shown for accomplishing the variable rate counting features already described. Thus, for example, NOR gates 7A–51, 7A–53, 7A–54, and 7A–56 in the steering loops of the second stage 7A–2 perform the function of insuring, firstly, that this stage does not change state for every clock pulse but rather changes state for every other clock pulse, and secondly, with the G output from the last stage 7A–8 coupled to NOR gate 7A–51, it is insured that when the decade changes its representation from decimal 9, stage 7A–2 remains in its 0 state (even though it would ordinarily change to a 1 state) so as to properly represent the proper permutation for decimal 0. NOR gates 7A–57 and 7A–58 in the reset loop of stage 7A–8 are included for the purpose of insuring that that stage operates in accordance with the typical requirements of a binary-coded-decimal counting decade. If this were a pure binary counter, the application of a counting pulse when the decade represents decimal 9 would not change the 8-unit stage since a binary counter represents numbers from 0 through 15. In a binary-coded-decimal counter, however, the application of a counting pulse to the counter when it represents decimal 9 should switch it to a condition representing decimal 0. Therefore, the 8-unit stage must be switched from a 1 state to a 0 state in order for the counter to go from decimal 9 to decimal 0. This is the function of gates 7A–57 and 7A–58, i.e., to switch the last stage 7A–8 from a 1 state to a 0 state after stage 7A–8 has been in the 1 state for two successive clock pulses. Changing stage 7A–8 from 1 to 0 also, and simultaneously, provides an output pulse from stage 7A–8 to the next succeeding decade in the chain, since a change in logic level from 1 to 0 corresponds to a pulse.

In order to achieve the feature wherein the counting of the counter may be blocked selectively, NOR gate 7A–61 and inverter 7A–62 have been inserted in the set steering loop of stage 7A–1, and NOR gate 7A–63 and inverter 7A–64 have likewise been inserted in the reset steering loop of stage 7A–1. The Normal Count pulse input line 7A–13 provides a second input to NOR 7A–61 and NOR 7A–63 and an additional input to NOR gates 7A–51, 7A–54, 7A–57. With the addition of these gates, decade 7A–10 becomes capable of having its counting blocked when a logic 1 signal is applied on lead 7A–13. On the other hand, when a logic 0 is applied to lead 7A–13, the normal counting cycle occurs.

It remains to consider the elements of decade 7A–10 which permit it to make a Double Count when desired. In order to accomplish this, a NOR 7A–81 is associated with the set steering loop of stage 7A–2 as a second input to the already cited NOR 7A–53. Similarly, into the reset steering loop of stage 7A–2 is inserted a two-input NOR 7A–83 which has its output applied to the NOR 7A–56 in the same manner as was described for NOR 7A–81. A two-input NOR 7A–85 is associated with the reset steering loop of stage 7A–8 in a similar manner, in that the output of NOR 7A–85 constitutes a second input to the previously described NOR 7A–58. A third input to the decade 7A–10, i.e., in addition to 7A–14 and 7A–13, is lead 7A–15 which constitutes an input to each one of the three NOR gates 7A–81, 7A–83, and 7A–85. NOR 7A–81 additionally has two more input leads; the first being from the G output of stage 7A–8 and the second from the G output of stage 7A–2. The second input of NOR 7A–83 is from the H output of stage 7A–2 while the second input of NOR 7A–85 is from the H output of stage 7A–8.

Depending upon the logic states of the input leads 7A–13 and 7A–15, decade 7A–10 either counts the counting pulses coming in on lead 7A–14 straightforwardly one at a time, or does not count the counting pulses coming in at all, or registers a count of two for each of the counting pulses coming in. More specifically, decade 7A–10 provides:

(1) A normal count by one when lead 7A–13 is in the 0 state and 7A–15 is in the 1 state;

(2) A count of 0 when lead 7A–13 is in the 1 state and lead 7A–15 is in the 1 state;

(3) A count of two when lead 7A–13 is in the 1 state and lead 7A–15 is in the 0 state.

Consider first that variable rate decade 7A–10 is to count normally, i.e., a count of 1 for each counting pulse. This occurs when lead 7A–13 is in state 0 and lead 7A–15 is in the 1 state. Why this is so may be seen by looking at the NOR gates 7A–81, 7A–83, and 7A–85. Each of these NOR gates has an output of logic 0 and, therefore, leaves the respective succeeding NOR gates 7A–53, 7A–56, and 7A–58 unaffected when any other of the inputs to each of the NOR gates 7A–81, 7A–83, and 7A–85 is a logic 1. Therefore, a logic 1 applied on input 7A–15 effectively disables gates 7A–81, 7A–83, and 7A–85 and insures that there will be no additional effects upon the circuitry than would occur if this line were not present.

Next, consider that decade 7A-10 is to count by 0 for each clock pulse. Placing a logic 1 on lead 7A-15 assures that it has no effect on the logic arrangement of the decade and, therefore, conditioning lead 7A-13 with a logic 1 will control the decade. A logic 1 applied on lead 7A-13 blocks the interconnecting gates 7A-61, 7A-53, 7A-51, 7A-54, and 7A-57 thereby assuring that no action occurs.

Finally, consider when the Double Count lead 7A-15 a logic 0 applied thereto. Under these circumstances, variable rate decade 7A-10 counts by two rather than by one. Lead 7A-13 under these circumstances must have a logic 1 thereon for the purpose of making sure that the decade is blocked from normal counting so that the count-by-two circuitry can take over. It may be recalled that the binary-coded-decimal counter counts by two when the decade is in the decimal 0 through 7 logic conditions, inclusive, merely by changing the state of the 2-unit stage 7A-2. The stage of stage 7A-2 can change if, and only if, the output lead G is in the same state as the set steering lead A and the output lead H is in the same state as the reset steering lead B (under the assumption, of course, that input lead 7A-13 is in the 1 state). A logic 0 on lead 7A-15 is applied to stage 7A-2 circuitry through NOR gates 7A-81 and 7A-83. It is this logic 0 which is responsible for making the states of the G and A terminals of stage 7A-2 equal to each other and the states of the H and B terminals of stage 7A-2 equal to each other, so that an input trigger pulse on the C terminal of this stage can change the state thereof. In view of the preceding descriptions of flip-flop operation, it is deemed unnecessary to specifically trace the circuitry and flip-flop operation which will occur upon occurrence of the described signals when the decade 7A-10 registers a number from decimal 0 to decimal 7. This being the case, we will proceed to the consideration of the decade when a decimal 8 or 9 is registered therein.

When decade 7A-10 represents decimal 8 or 9, counting by two requires that the 8-unit stage 7A-8 rather than the 2-unit stage, change its state with a counting pulse. The circuitry associated with NOR 7A-85 in the reset steering lead of stage 7A-8 is responsible for providing this result. Looking at NOR 7A-57, it may be seen that one of the inputs is the 7A-13 lead which is in a logic 1 state for the count-by-two operation. This means that the output of NOR 7A-57 must be logic 0. NOR 7A-85, on the other hand, has two inputs, both of which are in the logic 0 state, i.e., input lead 7A-15 is in its 0 state appropriate for the count-by-two conditions and the input lead from the H terminal of lead 7A-8 is necessarily in the logic 0 condition since the 7A-8 stage must be in a logic 1 condition in order to represent decimal 8 or 9. Accordingly, the only two input leads to NOR 7A-85 are in a logic 0 state and, therefore, the output therefrom is a logic 1. NOR 7A-58, receiving its input from NOR gate 7A-85, has a logic 1 applied thereto on its input lead 7A-86. Accordingly, the output of NOR 7A-58 must be logic 0. It may be recalled that the C input of the last stage for the decimal 8 or 9 representation has a pulse absent condition; the D input has a pulse present condition due to the counting pulse applied; the A input must necessarily be in the 1 state since the stage is in the 1 state. These three conditions, with the impressed condition that the B input must be in the 0 state as a consequence of the action of NOR 7A-85 and lead 7A-15 being in the logic 0 state, mean that the counting pulse on lead 7A-14 must switch the state of the 7A-8 stage. It is readily verified that if the lead 7A-15 were in logic 1 state, the net result would be that the input to terminal B of stage 7A-8 would be in the logic 1 state; reference to the truth table of FIGURE 3H demonstrates that this would result in the failure of stage 7A-8 to change state.

Since lead 7A-13 is in a logic 1 state for this count-by-two operation, we are assured that no other of the stages 7A-1, 7A-2, 7A-8 can possibly change state since the effect of 7A-13 being in a logic 1 condition is to block the operation of those stages. Accordingly, with this combination of inputs, only the 7A-8 stage changes state with a counting pulse. In this way, decade 7A-10 of FIGURE 7A counts by two for every counting pulse input irrespective of which decimal number is then represented in the decade.

Throughout operation, the Feed Command Phase Counter continuously operates and frequently cycles at a variable rate. At all times that velocity control is exercised, there is a pulse output from the Feed Command Phase Counter on lead 7A-21, the phase of which is a function of the summation of the 0 count and 2 count operation of the variable rate decade 7A-10. If the variable rate decade were never commanded to count other than in the normal progression of forms, then the output of the Feed Command Phase Counter would be a 250 cycle per second square wave precisely in phase with the 250 cycle per second fine position feedback signal.

In FIGURE 7C, curve 7C-95 shows a 250 cycle per second signal such as might be developed by the fine position feedback resolver. Curve 7C-95 shows a 250 cycle per second square wave output from the Feed Command Phase Counter under the condition that the counter is operating as a normal fixed rate counter. Curve 7C-97 shows the output of the Feed Command Phase Counter when one of the input counting pulses has been counted as two pulses. The phase of curve 7C-97 will be seen to be slightly in advance of curve 7C-95. Since for one input counting pulse, the phase counter counted two output pulses, it follows that the leading edge of the first output pulse (of curve 7C-97) from the last decade of the phase counter will be provided after 999 input clock pulses rather than after 1000 clock pulses as would ordinarily be the case if the phase counter counted exclusively by one. Accordingly, the phase lead of curve 7C-97 over that of 7C-95 is equal to 1/1000 of a cycle of the 250 cycle per second pulse train curve 7C-95.

Similarly, curve 7C-98 shows the situation for the output of the Feed Command Phase Counter when the counter has counted a 0, i.e. skipped a count, for one of the input clock pulses. Here the curve 7C-98 lags the curve 7C-95 slightly. It is approximately 1/1000 of a cycle behind that of curve 7C-95 since the Feed Command Phase Counter has to count 1001 input clock pulses before it provides the leading edge of its output pulse. If the velocity command signal from the Velocity Control Circuit (FIGURE 5) is a pulse train at a steady rate, the phase of curve 7C-97 (or 7C-98, dependent upon whether the velocity is to be in a positive or negative direction) continuously changes relative to curve 7C-95, and at a steady rate. This is because the Feed Command Phase Counter is being told to count two for specified input clock pulses at a fixed rate. Thus, for example, it may be that the frequency of the Velocity Control Circuit commands the Feed Command Phase Counter to count two pulses for every 25 input counting pulses. Under these circumstances, the phase will change 1/1000 of a period after every 25 input clock pulses. This steady rate of phase shift in the output will change if the pulse rate from the velocity changes. If it does change, the rate of phase shift out of the Feed Command Phase Counter will also change.

*Phase Comparators and Command Larger Detector (FIGURES 8, 8A, 8B, 8C)*

In the preceding sections, inllustrative means have been specifically described for producing command signals which represent both a desired position and a velocity with which the equipment should proceed to that desired position. The subsequent sections are directed toward the means for utilizing these command signals. As already pointed out with respect to the general description given in conjunction with FIGURE 2, the elements for utilization include: comparators wherein the position command signals are compared with the position feedback signals in order to develop an error value which can be used to drive the equipment; a command larger detector for determining the direction in which the equipment must move in order to attain a commanded position; and a phase discriminator operative to generate an analog signal proportional to the distance to be covered. These control elements, plus a feed allowed circuit for establishing whether or not velocity controlled operation is in effect, are now to be discussed in detail.

FIGURE 8 illustrates the circuitry which may be used for performing the initial comparison operation from which control signals are developed for moving the equipment and also the means by which the direction in which the movement is to take place is determined.

Considering first the equipment which is used to compare the command position information with the actual position information, attention is directed to the comparators disposed across the righthand portion of FIGURE 8. In the present illustrative embodiment, a "zone" technique is employed for establishing the control over machine motion. In a proportional control system, the purpose of establishing zones is simply to determine which feedback resolver, i.e. the coarse, medium, or fine, should be used to establish the error signal. In a clutch or switching servo, they are used to establish the slow-down point and to determine when the final position has been achieved. In the instant embodiment, four discrete zones are established: a 0.6 of an inch (0.6") zone, a 0.2 of an inch (0.2") zone, a 0.08 of an inch (0.08") zone, and a 0.03 of an inch (0.03") zone.

The establishment of the 0.6" zone is accomplished by observing the count accumulated in the Coarse Command Phase Counter (4-38 in FIGURE 4) which includes tens, units, and tenths digits. The Command Phase Counter is considered to be "in-the-0.6"-zone" when its total count is anywhere in the 12 count interval from 994 to 6 counts. During the time necessary for the machine to reach its commanded position, the Command Phase Counter will pass through the zone a number of times, since it is counting at the rate of 250 kilocycles per second. It should be appreciated that with the equipment hereindescribed, the described counts of the Coarse Command Phase Counter define a zone extending 0.6" on either side of the point at which the command signal and the feedback signal are to be exactly in phase. This zone is obviously a band 1.2 inches wide.

The actual position of the apparatus is "in-the-zone" when the position feedback signal approaches the same phase displacement of the command signal, so that it goes from a logic 1 to a logic 0 during the time interval defined by the Command Phase Counter.

Each zone detector consists of two flip-flops. The 0.6" zone detector, for example, comprises a zone command flip-flop 8–ZC and a position-in-zone flip-flop 8–PIZ located adjacent to one another in the upper right quadrant of FIGURE 8. Zone command flip-flop 8ZC serves the function of signalling that the Command Phase Counter, is, or is not, in the zone. Flip-flop 8ZC is set if the Command Phase Counter establishing the zone (in this case, the Coarse Command Phase Counter) is in the zone, and reset if it is not in the zone. Position-in-zone flip-flop 8–PIZ determines whether or not the actual position, as defined by the position feedback signal, is in the zone. Obviously, this is done by comparing the condition of the zone command flip-flop with the position feedback signal.

Flip-flop 8–ZC is coupled to flip-flop 8–PIZ such that when flip-flop 8–ZC is set, flip-flop 8–PIZ is steered to set and when flip-flop 8–ZC is reset, flip-flop 8–PIZ is steered to reset. The position-in-zone flip-flop 8–PIZ is triggered by the coarse feedback signal from the coarse resolver and consequently, if it happens that the position feedback signal goes from a logic 1 to a logic 0 during the interval that the zone command flip-flop 8–ZC is set, then flip-flop 8–PIZ will be set by the transitional voltage of the feedback signal. (In FIGURE 8 the position feedback signal generating equipment is symbolically illustrated at 8–PFS in the upper left quadrant.) This condition signifies that the actual position is somewhere within the zone. If the position is not within the zone, flip-flop 8–PIZ will be triggered while the zone command flip-flop 8–ZC is in a reset state and consequently, flip-flop 8–PIZ will remain reset. If, for any reason, the position is within the zone and passes through it, flip-flop 8–PIZ will first be set when the position enters the zone and will be reset when it leaves the zone.

The limits of a zone are established by gating directly out of various stages of the Command Phase Counter into the set and reset steering inputs of zone command flip-flops and also into the trigger inputs of the zone command flip-flops. Considering the 0.6" zone again, by way of example, it is established between 994 counts and 6 counts, i.e. between registration of 994 and 006, of the Coarse Command Phase Counter. This is implemented by steering flip-flop 8–ZC to set when the count reaches 990 and triggering it to set when the count reaches 994. The circuitry for performing this includes NOR 8–10 and inverter 8–11 which interconnect Command Phase Counter outputs $\overline{1}$, $\overline{8}$, $\overline{10}$, and $\overline{80}$ to the set steering input of flip-flop 8–ZC. These inputs assure that the set steering input is a logic 0 for any count of the Coarse Command Phase Counter of 990 or greater. The $\overline{0.4}$ output of the Coarse Command Phase Counter is applied to the set trigger terminal of flip-flop 8–ZC and accordingly, upon registration of 994 counts, the flip-flop will be set.

Once set, the upper limit of the zone is established by the time for reset. As already noted, for the 0.6" zone this is to be upon occurrence of a count of 6 and is implemented by NOR gate 8–12 and inverter 8–13. The inputs to NOR 8–12 from the Command Phase Counter are $\overline{0.4}$ and 8. The reset trigger is obtained from the $\overline{0.2}$ output of the Command Phase Counter.

The establishment of the narrower zones is accomplished in a completely analogous fashion and the signals applied from the Command Phase Counters in order to define the particular zones are clearly identified in the drawings; consequently, the specific circuitry will not be traced here. It is sufficient to understand that the position-in-zone flip-flops exhibit a set, or 1 state, when the apparatus position is within the defined zone and will continue to exhibit this state as long as the equipment remains within the zone.

Having explained the zone technique for determining when the position is within a particular zone and thereby affording information upon which control over the velocity of positioning may be based, consider now the problem of determining in which direction the apparatus must move.

FIGURES 8A, 8B, and 8C show the basic phase relationships between the reference signal output from a Reference Pulse Rate Divider (FIGURE 4), the position command signal from one of the Command Phase Counters (FIGURE 4), and a corresponding position feedback signal from the Position Feedback Apparatus (FIGURE 8). Considering the coarse command and position signals, FIGURE 8A shows a command of 00.0000 with the apparatus in the desired position. The command of 00.0000 of an inch is indicated by the fact that the command signal 8A–2 is in phase with the reference signal 8A–1, both transferring from a logic 1 to a logic 0 state at the same point in time. The fact that the apparatus is actually in the commanded position is indicated by the fact that the position feedback signal 8A–3 is in phase with the command signal 8A–2.

FIGURE 8B shows the phase relationships of the reference, command, and position feedback signals when the actual apparatus position is at the reference point, but the commanded position has been changed to 60.0000 inches. The command of 60.0000 inches is indicated by the fact that the command signal 8B-2 transfers from a logic 1 to a logic 0 six tenths of a cycle to the left of the reference point. The reason for this transition will be clear when it is considered that the Command Phase Counter attains its full registration of 1000 after counting only 400 clock pulses. Under the described conditions, the machine must be made to move until the feedback position signal 8B-3 is brought in phase with the command signal.

From the standpoint of the electrical signals themselves, the feedback position signal 8B-3 could be brought into synchronism with the command signal 8B-2 by shifting in either direction. If it were shifted to the left, it would correspond to the apparatus moving in the direction of increasing numbers, i.e. in a positive direction. Shifting it to the right would require that the apparatus move in the direction of decreasing numbers, i.e. in a negative direction. Since it has been stated that the apparatus was originally at the zero reference, it is obviously necessary that the machine move in the direction of increasing numbers to be practical. It is the purpose of the command direction detector to indicate which direction the machine is to move.

FIGURE 8C shows the proper translation of the position signal 8C-3 to left to attain correspondence with the command signal 8C-2.

The command direction or Command Larger Detector is illustrated on the left side of FIGURE 8. It consists of five flip-flops: a 99 inch command reference flip-flop 8-CR; a coarse command set flip-flop 8-CCS; a coarse command larger flip-flop 8-CCL; a medium command larger flip-flop 8-MCL; and a fine command larger flip-flop 8-FCL. The function of this circuitry is to determine whether or not the command signal is larger than the position signal. The particular components of the circuit which are used to make this determination are selected by the zone flip-flops which were described hereinbefore.

The 99 inch command reference flip-flop 8-CR serves to establish a reference point from which to make phase observations. It is desirable to locate the reference point as close to the 100 inch command position as possible, but, obviously it cannot be precisely at this command point because this is also identified by a 0.0 inch command. The command reference flip-flop 8-CR functions under the control of signals from the Reference Pulse Rate Divider discussed in conjunction with FIGURE 4. Its state follows the 250 cycle per second signal available at R500 very closely, except that it is set 10 clock pulses after the R500 signal goes from a logic 1 to a logic 0 condition. This operation is implemented by applying the R500 signal to the set steering terminal of the flip-flop and triggering it with R8 which is a 25 kilocycle per second signal. As the R500 signal and the R8 signal assume a logic 0 condition exactly in phase, flip-flop 8-CR will not set at this coincident time inasmuch as the steering must precede the trigger by a discrete amount. Upon the next R8 pulse, however, which occurs 10 clock pulses later, the flip-flop 8-CR will be triggered to its set state. Once set, flip-flop 8-CR steers itself to a reset condition. The reset trigger is $\overline{R500}$. As shown in FIGURE 8, the reset output of command reference flip-flop 9-CR is used as a trigger input to the coarse command larger flip-flop 8-CCL.

Flip-flops 8-CCS and 8-CCL are used to compare the coarse command signal with the coarse position feedback signal for determining whether or not the command is larger. Coarse command set flip-flop 8-CCS is set by the output of the Coarse Command Phase Counter and reset by the Coarse Position Feedback signal. Its output, therefore, is a pulse having a width determined by the difference in phase between the command and position signal. The coarse command larger flip-flop 8-CCL is steered to reset if the coarse command set flip-flop is set and it is steered to set if the coarse command set flip-flop is reset. As already noted, it is triggered from the H or reset output of the 99 inch command reference flip-flop 8-CR.

Assume the phase relationships between the command and position feedback signals established by a command of 10 inches and a true position of 90 inches. If the apparatus is erroneously directed to move in the short direction to bring the command and position feedback signals into correspondence, the machine would inadvertently go beyond its normal travel limits of 100 inches. This is prevented because each time the 99 inch reference trigger signal appears, coarse command set flip-flop 8-CCS is in a set state and thus, coarse command larger flip-flop 8-CCL will remain in its reset state. This discretely indicates that the command position is less than the actual position of the apparatus and that the machine must move in the direction of decreasing numbers (negative direction) in order to properly attain correspondence. In the event that the command had been 90 inches and the actual position 10 inches, the coarse command set flip-flop 8-CCS would be reset upon the generation of a triggering pulse by the 99 inch command reference flip-flop 8-CR. Accordingly, the coarse command larger flip-flop 8-CCL would be set and the fact that the command was larger would, therefore, be discretely indicated.

The direction detector elements made up of coarse command set flip-flop 8-CCS and coarse command larger flip-flop 8-CCL are operative to determine the direction in which the machine must move when the position is outside of the 0.6" zone. Accordingly, NOR 8-14 has as inputs thereto the H output of coarse command larger flip-flop 8-CCL and the G output of position-in-zone flip-flop 8-PIZ. Only when the actual position is not within the 0.6" zone will NOR 8-14 be enabled, because when within this zone, the logic 1 appearing on the G output of flip-flop 8-PIZ will force the output of NOR 8-14 to be a logic 0 irrespective of the conditioning of the coarse command larger flip-flop 8-CCL.

When the apparatus is in a position between the 0.03" zone and the 0.6" zone, the direction determination, i.e. command larger determination, is made by the medium command larger flip-flop 8-MCL. When the actual position is within the 0.030" zone, the command larger determination is made by the fine command larger flip-flop 8-FCL. The latter flip-flops are steered so that when their respective position feedback signals make a transition from a logic 1 to a logic 0 during the time that their respective command phase counter is in the first fifty percent of their count registration, the flip-flops will be set. When the position feedback signals make this transition during the time that their respective command phase counters are in the last fifty percent of their numerical registration, the flip-flops will be reset. In the case of medium command larger flip-flop 8-MCL, these conditions are imposed by applying the 1 and $\overline{1}$ outputs from the Medium Command Phase Counter to the set steering and reset steering inputs thereof respectively, and applying the medium position feedback signal to the trigger terminals thereof. In the case of the fine command larger flip-flop 8-FCL, the signals applied to the set steering and reset steering inputs require the use of NOR gates 8-19, 8-20, 8-21, and inverter 8-22. The specific signals applied to accomplish the recited functioning of the fine command larger flip-flop 8-FCL are shown on FIGURE 8.

Just as NOR 8-14 selected the coarse command larger flip-flop output when the actual position was outside of the 0.6" zone, NOR 8-15 selects the output of the medium command larger flip-flop 8-MCL when the actual position is between the 0.03" and 0.6" zone, and NOR 8-16 selects the output of the fine command larger flip-flop 8-FCL when the actual position is within the 0.03" zone. The actual command larger signal is extracted from the output of a NOR 8-17 which has as inputs thereto the outputs of NOR 8-14, 8-15, and 8-16. When any of the NOR gates just recited supplies a unique logic 1 output the output of NOR 8-17 will be logic 0 indicating that the command is larger than the actual position. In keeping with the conventions adopted, the lead 8–19 is consequently labeled "Command Larger" and an inverter 8–18 connected to the output of NOR 8–17 supplies a signal on a lead which is labeled "Command Larger."

*Discriminator—Automatic Positioning Operation (FIGURE 9)*

Thus far, circuitry has been described that is designed to produce command signals providing information representing the position the apparatus is to assume and the velocity with which it is to proceed. It now remains to describe the particular circuits which respond to these signals by developing control voltages for driving the X-axis feed mechanism.

The function of the discriminator is to respond to the aforedescribed signal conditions by producing modulated currents for application to the drive mechanism causing it to respond with a velocity in accordance with the desired mode of operation. The discriminator may be considered to be divided into two sections, each of which performs a slightly different function. A first section culminates in the elements within dotted line 9–22 and is operative during the automatic positioning mode of operation to provide a steady state current of a polarity determined by the command larger detection circuitry (FIGURE 8) as long as the error between the commanded and actual position signals is greater than 0.2 of an inch. The second section, culminating in the circuitry within the dashed lines 9–23, is operative during the automatic positioning mode of operation to deliver a pulsing current whose average value is proportional to the phase difference between the signals from the position command phase counters and the feedback resolvers, and whose polarity corresponds to the direction of the error. This second section is further operative during controlled velocity operation to deliver a pulsing current whose average value is proportional to the phase difference between the signals from the feed phase counter and the feedback resolvers.

During the automatic positioning mode of operation wherein a predetermined or programmed velocity of positioning is to be used, a large error will cause both circuit 9–22 and 9–23 to operate maximally. When the error is reduced to 0.2 of an inch, circuit 9–22 is turned off by a signal from the 0.2" zone detector and the output of the proportional circuit 9–23 only controls the remaining positioning. An operational amplifier 9–24 is controlled by the outputs of circuits 9–22 and 9–23 and delivers the control current to the X-axis feed mechanism 9–25.

As more fully described hereinafter, the output of the proportional control circuit 9–23 is relatively constant at a maximum value until the 0.08" zone is reached at which time it becomes proportional to the error between the commanded and actual position. Thereafter, the drive signal output from the proportional circuit 9–23 gradually reduces in magnitude until the equipment is positioned exactly on the commanded position. The circuit 9–22 operates differently from the proportional circuit 9–23 in that it provides a maximum signal output at all times the position error is in excess of the 0.2" zone and nothing when within that zone. Accordingly, circuit 9–22 is designated a "Traverse" circuit because it delivers a constant signal denoting a predetermined positioning velocity while outside of the 0.2" zone; and circuit 9–23 is designated a "Proportional" circuit because it delivers a signal proportional to the position error when the equipment comes within the 0.08" zone.

The velocity control circuitry is operative to position the apparatus via the proportional circuitry 9–23 when the velocity control mode of operation is in effect. At other times the proportional control circuitry is automatically operative under programmed velocities as just described. In order to provide a clear understanding of circuit operation, the automatic positioning mode of operation will first be considered. Thereafter, the effect of the velocity control signals upon this discriminator circuit will be described in conjunction with the special circuitry incorporated for handling it.

Three flip-flops, a command flip-flop 9–C, a reset flip-flop 9–R, and a position flip-flop 9–P are the operative switching elements during an automatic positioning operation. Before the proportional circuit 9–23 becomes operative, i.e. before the 0.08" zone is attained, either command flip-flop 9–C or position flip-flop 9–P will be set. If the command is larger than the position, command flip-flop 9–C will be set; and if the command is smaller than the position, the position flip-flop 9–P will be set. The fact that one of these flip-flops is continuously set accounts for the constant error signal from Proportional circuit 9–23 in the position error interval from 0.2" to 0.08".

The reason for this flip-flop conditioning will be seen by considering the inputs to these flip-flops. Command flip-flop 9–C has its set steering input A conditioned by NOR gates 9–10 and 9–11. The inputs to NOR 9–10 include a Command Larger signal and a Traverse signal; consequently, a logic 1 is available at the output of NOR 9–10 when the command is larger than the position and traverse is commanded. (The latter signal designating automatic positioning can be generated in any manner, including manually.) This logic 1 signal is applied as one input to NOR 9–11, the other input being a lead from the G output of the position-in-0.08"-zone flip-flop (FIGURE 8). In effect, therefore, NOR 9–11 is enabled when the equipment is outside of the 0.08" zone to pass whatever signal is applied to its other input from NOR 9–10. Thus, command flip-flop 9–C has its set steering lead conditioned with a logic 1 or a logic 0 signal depending upon whether or not traverse (automatic positioning) is commanded, and the command is smaller or larger than the position respectively.

A similar arrangement is true with respect to the set steering input A of position flip-flop 9–P. However, in the case of flip-flop 9–P, the logic signal applied is exactly the opposite of that applied to command flip-flop 9–C. This is implemented by using a single three input NOR 9–12 having as inputs thereto: Command Larger, Traverse, and P 0.08. The set trigger input to command flip-flop 9–C is coupled directly to the output of the fine Command Phase Counter (FIGURE 4) and the set input of fine position flip-flop 9–P is coupled directly to the output of the Fine Position Resolver (FIGURE 8). Accordingly, if the command is larger and the error lies outside of the 0.08" zone, a logic 0 is applied to the set steering input of the command flip-flop and a logic 1 is applied to the set steering input of the position flip-flop. In response to these signals, command flip-flop 9–C will be set by the fine command signal. In the event that the command is smaller than the actual position, a logic 0 is applied to the set steering input of the position flip-flop and a logic 1 is applied to the set steering input of the command flip-flop. In this latter situation, position flip-flop 9–P will be set by the fine position signal and the command flip-flop will remain in a reset condition. This conditioning of flip-flops 9–C and 9–P outside of the 0.08" zone results in a constant error signal being developed from the proportional circuit 9–23.

In order to understand the proportional operation when the command is less than 0.08" away from the actual position, assume that the command is larger. Under these conditions, command flip-flop 9–C will be set as above described, the trigger for this flip-flop being derived from the output of the Fine Command Phase Counter (FIGURE 4). When the 0.08" zone boundary is reached, the position flip-flop 9–P will be steered to set because the G output of the position-in-0.08"-zone flip-flop will provide a logic 1 input to NOR 9–12 which in turn provides a logic 0 to the set steering input of position flip-flop 9–P. Consequently, when the fine position feedback signal goes to logic 0, position flip-flop 9–P is set. When the error is still large within the 0.08″ zone, as it is in when the zone is first achieved, it will be understood that the command flip-flop 9–C is set for almost an entire cycle of the Fine Command Phase Counter during this interval of time. Setting the position flip-flop 9–P causes a logic 0 output that is ultimately effective to steer the reset flip-flop 9–R to set and the next time the least significant decade of the Fine Command Phase Counter is reset, i.e. in $\frac{1}{125,000}$ of a second, the reset flip-flop is triggered to a set condition. Set steering of the reset flip-flop is accomplished from the H output of position flip-flop 9–P via NOR gates 9–18, 9–20, 9–21, and 9–13. These NOR gates, as will be apparent from a consideration thereof, impose the conditions: (1) the command is larger (NOR 9–18 and 9–20; (2) the position is greater than 0.03 (NOR 9–21); (3) traverse is commanded (NOR 9–21). Set steering of reset flip-flop 9–R is also accomplished by means of NOR gates 9–15, 9–16, 9–17, and 9–13 which impose the conditions: (1) flip-flop 9–C is set and feed allowed signal is logic 0 (NOR 9–15); (2) flip-flop 9–P is set. Upon the setting of flip-flop 9–R, the logic 0 produced at the H output thereof is applied as a reset steering input to both command flip-flop 9–C and position flip-flop 9–P and they are reset the next time the least significant stage of the Fine Command Phase Counter is switched to a set condition, i.e. within $\frac{1}{125,000}$ of a second.

The described cycle repeats with both flip-flops being steered to set under the control of the signal from the position-in-0.08″-zone flip-flop. Each time it will be understood that inasmuch as the equipment is being driven toward the commanded position, the command flip-flop will remain set for a shorter portion of each cycle, that portion being proportional to the magnitude of the phase displacement. At the point of coincidence, the command flip-flop 9–C and the position flip-flop 9–P are set for an equal length of time. This equality of time is effective via the proportional control circuit 9–23 to equalize the drive of the operational amplifier 9–24 and consequently, the feed mechanism has driven the apparatus to the commanded position.

In order to complete an operating cycle, it should be noted that the reset flip-flop 9–R automatically resets itself upon occurrence of the next $\overline{0.0001}$ trigger pulse after it has been set.

If the position feedback signal had been larger than the command signal, the position flip-flop 9–P would have been steered to set by virtue of the logic 1 presented by the $\overline{\text{Command Larger}}$ signal. The flip-flop would be triggered upon occurrence of the fine position feedback signal. The net effect of the entire operation would be that position flip-flop 9–P would remain set for a length of time proportional to the phase displacement, and the command flip-flop 9–C would be set briefly to steer the reset flip-flop 9–R to set which, in turn, would reset the trio of flip-flops as previously described. In other words, the equipment would be driven by a signal of opposite polarity under these circumstances and consequently, would be driven in an opposite direction to attain its objective.

Consideration of the proportional feedrate control circuit 9–23 will make it clear that the command flip-flop 9–C controls the period of application of negative currents to the operational amplifier 9–24 and the position flip-flop 9–P controls the application of positive currents to operational amplifier 9–24. The set state of command flip-flop 9–C when it is in control, generates a logic 0 signal at the H output thereof which is applied via NOR gates 9–15, 9–16, and 9–26 to the anode of a diode 9–27. This combination of NOR gates insures the following conditions: (1) velocity control is not desired or in process (NOR 9–15, NOR 9–16); and (2) the $\overline{\text{Delay}}$ signal has been generated (NOR 9–26). This $\overline{\text{Delay}}$ signal may be generated in any fashion, to occur a suitable period of time following the reading of new data into the control system to insure proper cycling and permit establishment of the aforedescribed zones. Under these conditions, the logic 1 at the output of NOR 9–26 insures that the negative supply from this proportional gating circuit is applied via a diode 9–32 to the input of operational amplifier 9–24 and continues to be so applied until the command flip-flop 9–C is reset.

When the position flip-flop 9–P is in control it is effective via NOR 9–28 and inverter 9–29 to provide for the application of a positive signal to the operational amplifier 9–24. Specifically, under these conditions, the logic 0 presented at the H output of position flip-flop 9–P is applied via NOR 9–28 and 9–29 to provide a logic 0 at the cathode of a diode 9–30. Had this been a logic 1, diode 9–30 would have provided a short circuit for the positive supply. Inasmuch as it is not, the positive supply is coupled via a diode 9–31 to the input of the operational amplifier 9–24 and accordingly, drives the X-axis feed mechanism in the appropriate direction. It should be noted that when the position flip-flop 9–P is in control, the only limiting factor between it and the operational amplifier 9–24 is the fact that the $\overline{\text{Delay}}$ signal must have occurred and provided a logic 0 at the input of NOR 9–28.

The foregoing explanation assumed that the motion commenced when the error was greater than 0.08 of an inch and consequently, the position was not within the 0.08″ zone. These conditions assured that the command flip-flop set first for errors in which the command was larger and that the position flip-flop 9–P set first if the command was smaller. However, if the initial error is less than 0.08 of an inch, and greater than 0.03 of an inch, which of the flip-flops 9–C or 9–P which sets first is indeterminate. In order to correct the sequence and make sure that motion is in the correct direction, a combination of signals from the 0.03″ zone are employed to steer the reset flip-flop to a set condition within one cycle of the command phase signal. This will reset the position or command flip-flops 9–P and 9–C, as required, and initiate the sequence so that the proper direction is commanded. This combination of signals is applied via NOR 9–14 and NOR 9–13 to the set steering input of reset flip-flop 9–R. As shown in FIGURE 9, the inputs to NOR 9–14 include: $\overline{0.01}$, $\overline{0.02}$, $\overline{0.04}$, the H output of the position-in-0.03″-zone flip-flop, and the $\overline{\text{Traverse}}$ signal. When all of these signals are equal to logic 0, a logic 1 is presented to the input of NOR 9–13 and consequently, the reset flip-flop 9–R is set steered. Also, when both the command flip-flop 9–C and the position flip-flop 9–P are simultaneously set, NOR 9–13 set steers reset flip-flop 9–R. The specific logic circuitry for accomplishing this need not be traced.

As previously noted, when the initial error is greater than 0.2 of an inch, the H output of the position-in-0.2″-zone flip-flop exhibits a logic 1, this logic 1 in combination with the determination of whether the command is larger or smaller than the actual position is utilized via the Traverse control 9–22 to additively supply power to operational amplifier 9–24. The actual gating within the Traverse control circuitry is identical to that already discussed with respect to the gates in the Proportional control circuitry 9–23 and consequently, the discussion need not be repeated. The only distinction lies in the fact that an additional NOR 9–33 insures that the automatic positioning mode has been selected by introducing $\overline{\text{Delay}}$ and $\overline{\text{Traverse}}$ signals to the same points as the outputs of the input NOR gates of the Traverse circuit 9–22.

A brief comment may be made as to the nature of the typical operational amplifier 9–24 which is a high gain amplifier of the well known type having a very high input impedance and a very low output impedance. It is connected with a large amount of feedback as shown in the circuit drawing. The feedback is accomplished by driving the amplifier from a low impedance source through an impedance and connecting another impedance between the output and the input. More than one input signal may be provided through more than one input impedance. Providing that the conditions described are met, the gain of such an amplifier for one input is equal to the feedback impedance divided by the input impedance. This makes possible a very simple control of the gain and provides isolation between the source itself and the output of the amplifier.

*Discriminator—Velocity Controlled Operation (FIGURES 9, 9A, 9B, 9C, 9D)*

The operation of the Discriminator under the controlled velocity mode of operation is similar to that described above, with several important distinctions. One of these distinctions lies in the fact that it is the output of the Feed Phase Counter shown in FIGURE 7, rather than the output of the Command Phase Counters shown in FIGURE 4 which governs the amount of voltage applied to the feed mechanism.

Recall that velocity controlled operation is accomplished, in essence, by generating a feedrate-position signal, the phase of which is varied at a rate determined by the input data. The Phase Discriminator in FIGURE 9 compares the phase of this feedrate-position signal with the phase of the feedback signal from the fine resolver and generates a control signal at the output of Proportional drive circuit 9–23 having a magnitude representing the desired feed velocity. The control signal from Proportional drive circuit 9–23 drives the mechanism to close on the feedrate-position. Since the feedrate-position is constantly changed, during the major portion of the operation the actual position is, in effect, continually trying to "catch-up" with the feedrate-position. Obviously, the feedrate-position will at some time correspond to the commanded position. At this time, the actual position will be in close proximity to the commanded position but will not have yet attained it. If feed were to continue under the control of the phase difference between the feedrate-position signal and the feedback signal, the desired position would be overshot. To avoid this and to decelerate the equipment gradually so that it comes to a complete stop at the commanded position, once the feedrate-position signal and the command position signal are in synchronism, control over the drive mechanism is exerted in accordance with the phase difference between the command position signal and the feedback signal. From the standpoint of Proportional drive circuit 9–23 the magnitude of the signal it generates is determined by the phase difference of the signals controlling it. When the command position signal and feedrate-position signal are synchronized they are displaced in phase from the feedback signal by the same amount and therefore the velocity commanded by the Proportional circuit when the command position signal becomes the controlling factor is identical to that of the preceding instant in time when the feedrate-position signal was the controlling factor.

For an understanding of the unique features involved in velocity controlled operation, refer to the Phase Discriminator in FIGURE 9 and the waveforms in FIGURES 9A, 9B, 9C, 9D. As will be explained in the next section concerning the Feed Allowed circuit in FIGURE 10, the Feed Allowed and $\overline{\text{Feed Allowed}}$ signals are at logic 1 and logic 0 respectively during controlled velocity operation. As a result, during such operation the feed mechanism 9–25 receives control signals having a magnitude proportional to the phase difference between the feedrate-position signal and the feedback position signal. These signals are generated by Proportional drive circuit 9–23 under the control of Feed flip-flop 9–F and Position flip-flop 9–P.

When the Feed Allowed signal is at logic 1, NOR 9–15 produces a logic 0 at its output. It will be recalled that during positioning only, this NOR gate transmits the position command phase information to Proportional drive circuit 9–23. Accordingly, during velocity controlled operation, the $\overline{\text{Feed Allowed}}$ signal effectively disables the control from the Command flip-flop 9–C at NOR 9–15.

While the output from Command flip-flop 9–C is rendered ineffective, it is replaced by the output from Feed flip-flop 9–F as the controlling influence over Proportional drive circuit 9–23. Feed flip-flop 9–F is steered to set by the presence of the logic 0 of the $\overline{\text{Feed Allowed}}$ signal on its set steering input. The Feed Command signal (i.e. the feed-position command signal) from the Feed Command Phase Counter in FIGURE 7 is applied to the set trigger input and causes setting of Feed flip-flop 9–F each time it changes from a logic 1 to a logic 0 condition. The reset steering input is controlled by the H output of Reset flip-flop 9–R and accordingly is conditioned by a logic 0 when flip-flop 9–R is set. Reset triggering is accomplished with the $\overline{0.0001}$ output of the Fine Command Phase Counter and consequently repetitively appears every 1/125,000 of a second.

The connections establish operation such that the set period of Feed flip-flop 9–F corresponds to the phase difference between the feedrate-position signal and the feedback position signal during positive feeding, and the set period of Position flip-flop 9–P corresponds to this phase difference during negative feeding. The gating circuitry between these flip-flops and Proportional drive circuit 9–23 accordingly establishes the signal output therefrom for periods corresponding to the set periods of these flip-flops.

While feeding positive, the set state of Feed flip-flop 9–F causes a logic 1 to be applied to one input of NOR 9–16. The other input of NOR 9–16 is at logic 0, as previously explained. Thus, a logic 0 appears at the output of NOR 9–16 which is effective via NOR 9–26 in Proportional drive circuit 9–23 to cause positive drive. The output of NOR 9–16 is applied jointly with the reset output of Position flip-flop 9–P to NOR 9–17. When Position flip-flop 9–P is set by the fine feedback position signal, a logic 1 is produced by NOR 9–17 which is applied via NOR 9–13 as a set steering signal for Reset flip-flop 9–R. On the next trigger pulse from the $\overline{0.0001}$ output of the Fine Command Phase Counter Reset flip-flop 9–R is set and, as noted hereinbefore, this results in conditioning all four of the flip-flops 9–F, 9–C, 9–R and 9–P for reset.

The above-described circuit functioning during positive feeding is illustrated graphically by the waveforms in FIGURES 9A and 9B; FIGURE 9B being a time expanded version of the more pertinent part of FIGURE 9A. These figures show the Command, Position, and Feed signals and the respective flip-flop states over a typical period of time. In the diagrams the effect of positive feeding is manifested by an advancing phase in the Feed waveform 9A–30, i.e. a continuing phase shift to the left. The Position waveform, 9A–20, as expected, similarly shifts to the left because the equipment is being driven to attain the instantaneous position defined by Feed waveform 9A–30. On the other hand, the Command waveform 9A–10 is stationary because it represents a fixed commanded position. Feed flip-flop 9–F and Position flip-flop 9–P follow their input signals by switching to a set state in response to each transition thereof from a logic 1 to a logic 0. Command flip-flop 9–C similarly follows Fine Command signal 9–10, but only within the 0.08″ zone. That this latter operation is so, will be apparent from a re-examination of the signals applied to the set steering input thereof, which were described in the preceding section.

In FIGURE 9A, at a time corresponding to 9A–55 the 0.08″ zone is entered and Command flip-flop 9–C begins to follow signal 9–10. Prior to this time, each time Position flip-flop 9–P and Feed flip-flop 9–F were simultaneously set, the resulting conditioning of Reset flip-flop 9–R caused their mutual reset shortly thereafter. Once the Command flip-flop begins to function, it too is reset by the coincidence of a set condition in both Position and Feed flip-flops. The time of occurrence of various conditions in a typical cycle is shown wherein the following conditions occur in sequence: at 9A-53, Command flip-flop 9-C is set; at 9A-50, Feed flip-flop 9-F is set; at 9A-51, Position flip-flop 9-P is set; and at 9A-52, all flip-flops are reset.

The special conditions under which feed control is transferred from the feedrate-position signal to the command signal occur at time 9A-54. These conditions will be fully considered in the following section on the Feed Allowed circuit.

When feeding in the negative direction, the feedback position signal occurs earlier in time than the feedrate-position signal. Referring to FIGURE 9 it will be seen that when Position flip-flop 9-P is set by the Fine position signal, it applies a logic 0 to the input of NOR 9-28 in the Proportional drive circuit to initiate generation of a negative drive control signal. Thereafter, when Feed flip-flop 9-F is set by the feedrate-position signal the aforedescribed joint appearance of logic 0 signals at the input of NOR 9-17 causes subsequent reset of all flip-flops with the consequent removal of the logic 0 input to Proportional drive circuit 9-23.

FIGURES 9C and 9D illustrate by waveforms the circuit functioning during negative feeding. FIGURE 9D is an expanded version of the more pertinent part of FIGURE 9C. Negative feeding is effected by continuously causing the Feed waveform 9C-30 to retreat in phase. This is manifested in the illustration as a phase shift to the right. Accordingly, both the Feed signal 9C-30 and the Position signal 9C-20 have a shift to the right. Once again, it should be noted that the Command signal 9C-10 is stationary in phase.

Examination of FIGURES 9C and 9D will show that each time the Position and Feed flip-flops are both set, reset is initiated. After time 9C-55 when the 0.08" zone is reached, this resetting also affects Command flip-flop 9C. A typical timing sequence is: at 9C-53, Command flip-flop 9C is set; at 9C-51, Position flip-flop 9-P is set; at 9C-50, Feed flip-flop 9-F is set; and at 9C-52, all flip-flops are reset. These figures also illustrate the special conditions that are effective to transfer feed control from the feedrate-position signal to the command signal at time 9C-54. These conditions will be amplified in the section on the Feed Allowed circuit.

*Feed Allowed Circuit (FIGURE 10)*

The Feed Allowed Circuit illustrated in FIGURE 10 is the permissive circuit for velocity control over the apparatus positioning. Its output appearing at lead 10-18 and lead 10-19 is used to start and stop the Feed Phase Counter (FIGURE 7) and to change the Discriminator (FIGURE 9) from an automatic positioning mode of operation to a velocity controlled mode of operation. The circuit comprises three flip-flops: the first, 10-ZD, produces a logic 0 output approximately four milliseconds after the equipment is first detected as being within the 0.08" zone; and the second and third, 10-PFA and 10-NFA apply logic 0 signals to NOR 10-14 during the period the feed is allowed. The circuits are controlled such that both flip-flop 10-PFA and flip-flop 10-NFA are set at the start of a velocity controlled operation and, depending upon the direction of apparatus movement, one resets when the Feed signal, i.e. the feed-position command signal from the Fine Command Phase Counter (FIGURE 4). When either one resets, the Feed Allowed signal and $\overline{\text{Feed Allowed}}$ signal become logic 0 and logic 1 respectively and as described hereinabove, this causes further rate control to be in accordance with the phase difference between the position command and feedback position signals.

As illustrated in FIGURE 10, both the Positive Feed Allowed flip-flop 10-PFA and the Negative Feed Allowed flip-flop 10-NFA are set steered by the application of a logic 0 $\overline{\text{Feed}}$ signal on their set steering inputs. The $\overline{\text{Feed}}$ signal is generated after the input data has been stored in the Feed Phase Counter and the Command Phase Counters. The particular fashion in which this signal is generated is not material to the invention but by way of example it may be selectively generated by equipment cooperating with the input data tape equipment whenever velocity controlled operation is involved. Approximately six milliseconds after the phase counters have commenced operation, a logic 0 signal is generated and applied to the set trigger input of both flip-flops via lead 10-17. This latter signal may also be generated in any number of fashions, the important factor being that it is delayed from the initial generation of the $\overline{\text{Feed}}$ signal.

The particular flip-flop which is subsequently reset is determined by whether or not the operation is proceeding in a positive or negative direction. When the feed is in a positive direction, Positive Feed Allowed flip-flop 10-PFA resets when a feed command signal from the Feed Phase Counter occurs during the time that the command flip-flop 9-C in the Discriminator (FIGURE 9) is in a reset state. When feeding in a negative direction, negative feed allowed flip-flop 10-NFA resets when a fine command signal occurs during the time that command flip-flop 9-C is set. From the description of circuit operations hereinbefore, it will be clear that the above situations occur when the feeding signal from the Feed Phase Counter is in coincidence with the fine command signal. In order to be sure that such coincidence is indicative of actual correspondence in commanded position and feedrate-position, the resetting is controlled to occur upon phase coincidence within the 0.08" zone, only.

Zone delay flip-flop 10-ZD imposes the aforementioned condition. It has the signal appearing on the H output of the position-in-0.08"-zone flip-flop applied to the set steering input thereof. The set triggering input of this flip-flop is energized by the medium range position feedback signal. Accordingly, flip-flop 10-ZD is a slave to the position-in-0.08" zone flip-flop. Due to the inherent switching times involved, flip-flop 10-ZD assumes a set state approximately four milliseconds after the position-in-0.08" zone flip-flop sets. When set, the H output of flip-flop 10-ZD applies a logic 0 to NOR 10-10 which has a companion input thereto the Command signal from the G output of the Command flip-flop 9-C. Thus, when Command flip-flop 9-C is set (indicating the command position signal has occurred and position is in 0.08" zone) a logic 1 is inverted by inverter 10-11 and applied to the reset steering input of Positive Feed Allowed flip-flop 10-PFA. The subsequent occurrence of the feedrate-position signal from the Feed Phase Counter switches flip-flop 10-PFA to a reset state. This in turn produces a logic 1 at one of the inputs of NOR 10-14 and thereby removes the Feed Allowed signals appearing on leads 10-18 and 10-19. Flip-flop 10-ZD is employed in order to prevent erroneous reset steering of flip-flop 10-PFA by the command flip-flop 9-C since the latter is always reset while feeding until within the 0.08" zone. The four millisecond delay allows command flip-flop 9-C to start monitoring the fine command signal before the command signal is gated via NOR 10-10 and inverter 10-11 to the reset steering input B of flip-flop 10-PFA.

The conditions required for resetting Positive Feed Allowed flip-flop 10-PFA when feeding in a positive direction are shown in FIGURES 9A and 9B wherein the states of this flip-flop are illustrated by waveforms 9A-40 and 9B-40. In FIGURE 9B particularly, it will be apparent that reset occurs at 9B-54 when the Feed signal 9B-30 comes during the time Command flip-flop 9-C is reset.

Reset of Negative Feed Allowed flip-flop 10-NFA does not require a zone delay flip-flop. It is accomplished via NOR 10-12 and serially connected inverter 10-13; the input to NOR 10-12 being the $\overline{\text{Command}}$ and $\overline{\text{Feed}}$ Delay signals. FIGURES 9C and 9D show the conditions required for resetting Negative Feed Allowed flip-flop 10–NFA. Thus, in FIGURE 9D, reset occurs at 9D–54 when the Command signal 9D–10 comes during the time that Command flip-flop 9–C is set.

Summary and claims

The foregoing description has presented an illustrative embodiment of an apparatus control system capable of establishing a position the apparatus is to assume and the rate with which the apparatus should proceed toward that position. Three modes of operation are facilitated by the unique apparatus disclosed. In a first operating mode, the apparatus is positioned at a predetermined rate only within a selected zone and thereafter at a rate proportional to the error between the commanded position and the actual position. In a second operating mode, the specific velocity with which the apparatus moves while attaining a commanded position is directed by input data equipment. In a third operating mode, the velocity of apparatus movement is directed by input data equipment and modified by manual adjustment.

While the above described circuitry constitutes a particular embodiment of the invention, it will, of course, be understood that it is not wished to be limited thereto since modifications may be made both in the circuit arrangements and in the instrumentalities employed. It is contemplated in the appended claims to cover any such modifications as fall within the true spirit and scope of the invention.

What is claimed as new and desired to be secured by Letters Patent of the United States is:

1. An object positioning system responsive to input data comprising in combination, position command means operative in response to said input data to generate a signal discretely representing the absolute position said object is to assume, position responsive means operative to produce a signal discretely representing the actual position of said object, velocity command means operative in response to said input data to produce a signal discretely representative of the velocity with which said object should traverse the distance between said absolute position and said actual position, feed means for selectively moving said object at a rate commensurate with the magnitude of a signal, first means controlled by the signals from said position command means and said position responsive means to generate a signal having a magnitude proportional to the distance between the commanded position and present position of said object, second means controlled by the signals from said velocity command means and said position responsive means and operative to produce a signal having a magnitude commensurate with the velocity with which said object is to traverse, and switching means for selectively applying the signals from said first means and said second means to said feed means.

2. An object positioning system as defined in claim 1 in combination with comparator means responsive to the signals from said position command means and said position responsive means to detect the presence of said object within a prescribed zone surrounding said absolute position, and means controlled by said comparator for rendering said switching means operative to effect application of the signal from said first means to said feed means.

3. The object positioning system as defined in claim 2 wherein said last mentioned means is operative when the magnitudes of the signals from said first and second means are equal.

4. An object positioning system wherein a commanded position is represented by a phase-coded command signal and the actual position is represented by a phase-coded position signal comprising in combination, feed means for selectively moving said object at a rate commensurate with the magnitude of a signal, comparator means for comparing said command and position signals to detect the presence of said object within a prescribed zone surrounding said commanded position, means controlled by said command and position signals and operative within said zone to supply said feed means with a signal having a magnitude proportional to the phase difference between said command and position signals, means for generating a phase-coded velocity command signal having a controllable phase relationship with respect to said position signal, and means for selectively supplying a control signal to said feed means having a magnitude proportional to the phase difference between said phase-coded velocity command signal and said position signal.

5. In an object positioning system wherein a commanded position is represented by a first phase-coded signal and the actual position is represented by a second phase-coded signal, feed means for selectively moving said object at a rate commensurate with the magnitude of a signal, means for generating a third phase-coded signal having a controllable phase relationship with said second phase-coded signal, first means responsive to said first and second signals for controlling said feed means with a signal having a magnitude proportional to the phase difference therebetween, second means responsive to said second and third signals for controlling said feed means with a signal having a magnitude proportional to the phase difference therebetween, and control means selectively operative to establish which of said first or second means controls said feed means.

6. An object positioning system as defined in claim 5 in combination with means for comparing said first and second signals to detect the presence of said object within a prescribed zone surrounding said commanded position, and means operative within said zone when the phase difference between said first and second signal is equal to the phase difference between said second and third signal to render said feed means responsive to said first means only.

7. In an object positioning system wherein a commanded position is represented by a phase-coded command signal and the actual position is represented by a phase-coded position signal, feed means for selectively moving said object at a rate commensurate with the magnitude of a signal, comparator means for comparing said command and position signal to detect the presence of said object within a prescribed zone surrounding said commanded position, first means operative when said object is outside of said zone to apply a substantially fixed magnitude signal to said feed means, second means operative when said object is within said zone to apply a signal to said feed means having a magnitude proportional to the phase difference between said command and position signals, velocity command means operative to produce a phase-coded velocity command signal having a controllable phase relationship with said position signal, means operative during the presence of an output from said velocity command means to disable said first means and to control said second means to apply a signal to said feed means having a magnitude commensurate with the phase difference between the velocity command signal and position command signal.

8. An object positioning system for positioning an object in response to input data comprising in combination, means for generating a reference signal, position command means operative in response to said input data to generate a position command signal having a phase relationship with respect to said reference signal discretely representing an absolute position of said object, position responsive means operative to generate a position signal having a phase relationship with respect to said reference signal discretely representing the actual position of said object, feed means for selectively moving said object at a rate commensurate with the magnitude of a signal, velocity command means operative in response to input data to generate a velocity command signal varying in phase with respect to said position signal at a rate determined by said input data, detection means for comparing said position command signal and said position signal and providing an output discretely representative of the relationship therebetween, the output of said detection means controlling said velocity command means to establish the direction of phase change between said velocity command signal and said position signal, and conversion means selectively operative in response to the phase difference between said position command signal and said position signal and in response to the phase difference between said velocity command signal and said position signal to apply signals to said feed means having a magnitude respectively commensurate with said phase differences.

9. An object positioning system as defined in claim 8 in combination with means for initially synchronizing said velocity command signal with said position signal at the commencement of a positioning operation.

10. An object positioning system as defined in claim 9 wherein said conversion means is operative to apply signals to said feed means having a magnitude commensurate with the phase difference between said velocity command signal and said position signal until said velocity command signal becomes synchronized with said position command signal and thereafter to apply a signal to said feed means having a magnitude commensurate with the phase difference between said position command signal and said position signal.

11. An object positioning system for positioning an object in response to input data comprising in combination, means for generating a reference signal, position command means operative in response to said input data to generate a position command signal having a phase relationship with respect to said reference signal discretely representing an absolute position of said object, position responsive means operative to generate a position signal having a phase relationship with respect to said reference signal discretely representing the actual position of said object, feed means for selectively moving said object at a rate commensurate with the magnitude of a signal, velocity command means operative in response to input data to generate a velocity command signal varying in phase with respect to said position signal at a rate determined by said input data, detection means for comparing said position command signal and said position signal and providing an output discretely representative of the relationship therebetween, the output of said detection means controlling said velocity command means to establish the direction of phase change between said velocity command signal and said position signal, means controlled by said position command signal and said position signal to detect the presence of said object within a prescribed zone surrounding said absolute position, and means operative when said object is outside of said zone to apply a signal to said feed means having a magnitude proportional to the phase difference between said velocity command signal and said position signal and operative when said object is within said zone and said velocity command signal attains phase coincidence with said position command signal to apply a signal to said feed means having a magnitude proportional to the phase difference between said position command signal and said position signal.

12. An object positioning system wherein a commanded position is represented by a phase-coded command signal and the actual position is represented by a phase-coded position signal comprising in combination, feed means for selectively moving said object at a rate commensurate with the magnitude of a signal, comparator means for comparing said command and position signals to detect the presence of said object within a prescribed zone surrounding said commanded position, a source of input data, velocity command means operative in accordance with said input data to generate a velocity command signal having a phase relationship with said position signal that varies at a rate determined by said input data, detection means for comparing said position command and said position signals and providing an output indicative of the relationship therebetween, means for controlling said velocity command means in accordance with the output of said detector to increase or decrease the rate of phase change in accordance with the relationship between said command and position signals, first means for generating a fixed magnitude signal, second means for generating a signal having an amplitude proportional to the phase difference between inputs thereto, means operative in the absence of said velocity command signal when said object is outside of said zone, to interconnect said fixed magnitude signal to said feed means, means operative in the absence of said velocity command signal to connect said second means to said feed means when within said zone, said second means being operative in the absence of said velocity command signal to supply an output signal having a magnitude proportional to the phase difference between said position command and position signal respectively, and means operative in response to said velocity command signal to connect said second means to said feed means when outside of said zone, said second means being operative in response to said velocity command signal to provide a signal having a magnitude proportional to the phase difference between said velocity command signal and said position signal.

13. An object positioning system as defined in claim 12 wherein said first means is controlled by said detector means to generate a signal of a first or a second polarity depending upon the relationship between said command position signal and said position signal.

14. An object positioning system as defined in claim 13 wherein said second means is further operative when said object is within said zone and said velocity command signal corresponds to said position command signal to provide a signal to said feed means that is proportional to the phase difference between said position command signal and said position signal.

15. Positioning apparatus for controlling the movement of an object to a desired position comprising means for generating a command position signal representative of the desired position of said object, means for generating a feedback signal representing the actual position of the object, means response to said command position signal and said feedback signal to provide a first signal, means for generating a command feed rate signal in synchronism with said feedback signal, means for varying a characteristic of said command feed rate signal at a rate commensurate with a desired object movement rate, means responsive to said varied command feed rate signal and said feedback signal to provide a second signal, means responsive to said object occupying a position without said given zone to move said object at a rate proportional to said second signal, and means responsive to the object occupying a position within a given zone surrounding said desired position to move said object at a rate proportional to said first signal.

16. Positioning apparatus for controlling the movement of an object to a desired position comprising means for generating a command position signal in phase analog form representative of the desired position of said object, means for generating a feedback signal in phase analog form representing the actual position of the object, means responsive to the phase difference between said command position signal and said feedback signal to provide a first signal, means for generating a command feed rate signal in phase analog form in synchronism with said feedback signal, means for varying the phase of said command feed rate signal at a rate commensurate with a desired object movement rate, means responsive to said varied command feed rate signal and said feedback signal to provide a second signal, means responsive to said object occupying a position without said given zone to move said object at a rate proportional to said second signal, and means responsive to the object occupying a position within a given zone surrounding said desired position to move said object at a rate proportional to said first signal.

References Cited

UNITED STATES PATENTS 3,148,316  9/1964  Herchenroeder.
3,172,026  3/1965  Schuman _____ 235—151.11

MALCOLM A. MORRISON, *Primary Examiner.*

MARTIN P. HARTMAN, *Examiner.*

A. J. SARLI, *Assistant Examiner.*